US008862607B2

(12) United States Patent
Ajitomi et al.

(10) Patent No.: US 8,862,607 B2
(45) Date of Patent: Oct. 14, 2014

(54) CONTENT RECEIVING APPARATUS WITH SEARCH QUERY GENERATOR

(75) Inventors: Daisuke Ajitomi, Kanagawa (JP); Yuji Irie, Kanagawa (JP); Hiroyuki Aizu, Kanagawa (JP); Naoki Esaka, Kanagawa (JP); Kohji Saiki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/356,708

(22) Filed: Jan. 24, 2012

(65) Prior Publication Data

US 2012/0179703 A1 Jul. 12, 2012

Related U.S. Application Data

(63) Continuation of application No. PCT/JP2009/063605, filed on Jul. 30, 2009.

(51) Int. Cl.
*G06F 17/30* (2006.01)

(52) U.S. Cl.
CPC ............................. *G06F 17/30386* (2013.01)
USPC ........................................................ 707/765

(58) Field of Classification Search
CPC .................. G06F 17/30563; G06F 2221/0704; G06F 17/30067; G06F 11/1464; G06F 17/30017; G06F 17/30386; H04L 65/4076; H04L 65/4084; H04L 41/20; H04L 29/12132; H04L 61/00
USPC ........................................................ 707/765
See application file for complete search history.

(56) References Cited

U.S. PATENT DOCUMENTS 6,904,427 B1 * 6/2005 Hagiwara et al. ...................... 1/1
7,146,362 B2 * 12/2006 Allen et al. ............................ 1/1
7,647,338 B2 * 1/2010 Lazier et al. ........... 707/999.102
(Continued)

FOREIGN PATENT DOCUMENTS

CN 1864159 A 11/2006
JP 05-324578 12/1993
(Continued)

OTHER PUBLICATIONS

International Search Report for International Application No. PCT/JP2009/063605 mailed on Sep. 1, 2009.

(Continued)

*Primary Examiner* — Pierre Vital
*Assistant Examiner* — Evan Aspinwall
(74) *Attorney, Agent, or Firm* — Amin, Turocy & Watson, LLP

(57) ABSTRACT

According to an embodiment, a receiving apparatus includes a memory, a first generator, a second generator, a transmitter, a receiver. The memory stores service information including search criteria set in a memory device and a connection method for connecting with the memory device. The first generator generates a common search query that is a search query expressing search conditions used in searching contents and that includes at least a pair of a common search condition attribute and a common search condition attribute value. The second generator generates a search query according to the search criteria specified in the service information with the use of the generated common search query. The transmitter transmits the generated search query to the memory device based on the connection method specified in the service information. The receiver receives, from the memory device, the attribute information obtained as a result of executing the search query.

8 Claims, 21 Drawing Sheets

(56) References Cited

U.S. PATENT DOCUMENTS

| | | | |
|---|---|---|---|
| 7,680,781 B1* | 3/2010 | Wasserman et al. ... | 707/999.004 |
| 7,822,762 B2* | 10/2010 | Payne et al. ........... | 707/765 |
| 7,853,961 B2* | 12/2010 | Nori et al. ............. | 719/328 |
| 8,224,839 B2* | 7/2012 | Krupka et al. ......... | 707/765 |
| 2006/0085391 A1* | 4/2006 | Turski et al. .......... | 707/3 |
| 2006/0195476 A1* | 8/2006 | Nori et al. ............. | 707/104.1 |
| 2007/0067388 A1* | 3/2007 | Angelov ................ | 709/204 |
| 2007/0288448 A1* | 12/2007 | Datta .................... | 707/5 |
| 2011/0307504 A1* | 12/2011 | Agrawal et al. ........ | 707/766 |

FOREIGN PATENT DOCUMENTS

| | | |
|---|---|---|
| JP | 2003-308335 | 10/2003 |
| JP | 2007-328661 | 12/2007 |
| JP | 2008-125022 | 5/2008 |
| JP | 2008-227947 | 9/2008 |

OTHER PUBLICATIONS

Mathkour et al.; "An Intelligent Mediator for Heterogeneous Data Sources", IEEE, 2003, pp. 1002-1006.

Chinese Office Action mailed Aug. 21, 2013 for Chinese Patent Application No. 20098160685 20090730, 18 pages.

Japanese Office Action for Japanese Patent Application No. 2011-524588 mailed on Feb. 4, 2014.

Chinese Office Action for Chinese Patent Application No. 200980160685.3 mailed on Mar. 7, 2014.

* cited by examiner

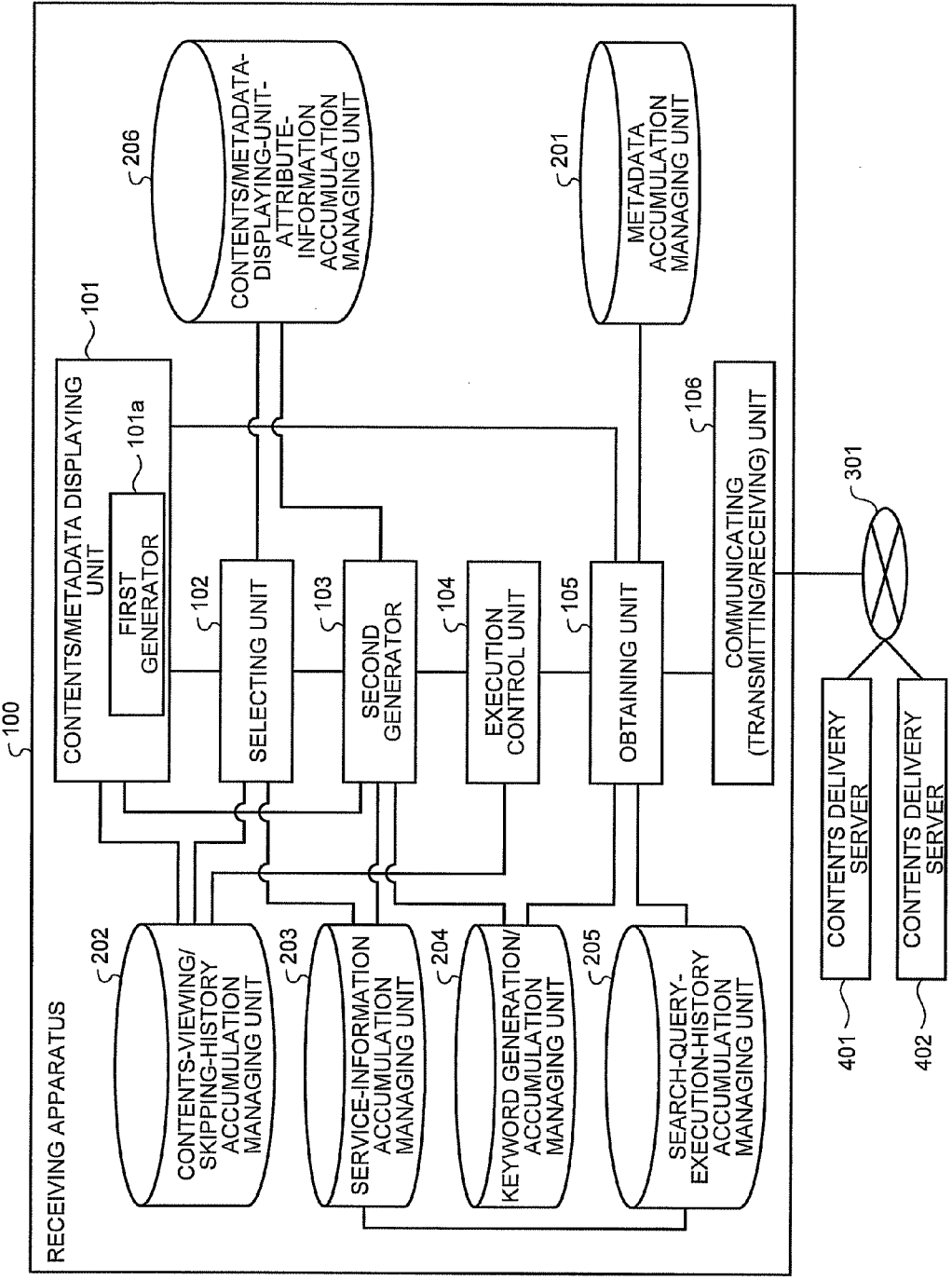

FIG.2

| COMMON METADATA ATTRIBUTE NAME | EXPLANATION |
|---|---|
| from | RETRIEVAL START INDEX |
| count | NUMBER OF RETRIEVALS |
| total | TOTAL NUMBER OF RETRIEVALS |
| for (i = 0; i < count; i++) { | |
| contentId | CONTENTS IDENTIFIER |
| name | CONTENTS NAME |
| synopsis | CONTENTS EXPLANATION |
| keyword | CONTENTS KEYWORD |
| mediaType | MEDIA TYPE (=video) |
| mediaSubType | MEDIA SUBTYPE (=programInfo) |
| { | SET OF METADATA ATTRIBUTES DEFINED BY MEDIA TYPE/MEDIA SUBTYPE |
| video.programInfo.format | VIDEO FORMAT |
| video.programInfo.parentalRate | AGE LIMIT |
| video.programInfo.genre | GENRE |
| video.programInfo.duration | CONTENTS LENGTH |
| video.programInfo.startDate | RELEASE/BROADCAST STARTING DATE |
| video.programInfo.endDate | RELEASE/BROADCAST ENDING DATE |
| video.programInfo.imagePath | THUMBNAIL IMAGE |
| } | |
| } | |

FIG.3

```
<?xml version='1.0' encoding='UTF-8'?>
<meta>
  <from>0</from>
  <count>100</count>
  <total>100</total >
  <content>
    <common>
      <contentId>0x0000000000000001</contentId >
      <name>CONTENTS NAME</name >
      <synopsis>SYNOPSIS OF CONTENTS.</synopsis>
      <keyword>KEYWORD A OF CONTENTS</keyword>
      <keyword>KEYWORD B OF CONTENTS</keyword>
      <mediaType value="video"/ >
      <mediaSubType value="programInfo"/ >
    </common>
    <programInfo>
      <format>mpeg2-ts</format>
      <parentalRate>15</parentalRate >
      <genre>0x01010222</genre>
      <duration>7200</duration>
      <startDate>2008-01-01T10:00:00+09:00 </endDate>
      <endDate>2008-01-01T12:00:00+09:00</endDate>
      <imapePath>/path/to/thumbnail</imagePath>
    </programInfo>
  </content>
  <content>
    <!--CONTENTS/METADATA INFORMATION-->
  </content>
  <!-- ... -->
</meta>
```

FIG.4

| ITEM NAME | VALUE (EXAMPLE) |
|---|---|
| for (i=0; i<VIEWING EVENT COUNT PER CONTENTS UNIT; i++) { | |
| VIEWING/SKIPPING FLAG | VIEWING/SKIPPING |
| VIEWING TIME | 6000 (sec) |
| USER IDENTIFIER | Father |
| CONTENTS IDENTIFIER | 0x123000ffeeddcc |
| EVENT OCCURRENCE DATE AND TIME | 200X/01/01 00:00:00 |
| ... | |
| } | |

FIG.5

| ITEM NAME | VALUE (EXAMPLE) |
|---|---|
| for (i=0; i<ACCUMULATED SERVICE COUNT; i++) { | |
| SERVICE IDENTIFIER | 0x01000001 |
| SERVICE NAME | XX VIDEO DELIVERY SERVICE |
| SERVICE PATH | http://www.service_0.example.com/search |
| ASSOCIATED GENRE | NEWS/REPORTING, DOCUMENTARY, LEARNING |
| PARENT SERVICE IDENTIFIER | - |
| INFORMATION NECESSARY FOR CONCATENATION WITH PARENT SERVICE | FOR DATABASE SERVICE, DATABASE NAME TO BE ATTACHED, ETC. |
| for (j=0; j<COMMON SEARCH CONDITION ATTRIBUTE COUNT; j++) { | |
| COMMON SEARCH CONDITION ATTRIBUTE | Genre |
| SEARCH CONDITION ATTRIBUTE NAME IN SERVICE | Category |
| ACTION TAKEN WHEN NO SEARCH CONDITION IS PRESENT FOR SERVICE | EX) IGNORE/SUBSTITUTE WITH KEYWORD SEARCH/··· |
| for (k=0; k<SEARCH CONDITION ATTRIBUTE VALUE; k++) { | |
| COMMON SEARCH CONDITION ATTRIBUTE VALUE | 0x01010222 (EX: COMMON GENRE CODE REPRESENTING "NEWS/REPORTING") |
| COMMON SEARCH CONDITION ATTRIBUTE VALUE IN SERVICE | News |
| } | |
| } | |
| for (j=0; j<COMMON CONTENTS METADATA ATTRIBUTE COUNT; j++) { | |
| COMMON CONTENTS METADATA ATTRIBUTE NAME | title |
| COMMON CONTENTS METADATA ATTRIBUTE NAME IN SERVICE | Title |
| } | |
| SEARCH QUERY FORMAT INFORMATION | QUERY FORMAT (REST, SOAP, SQL, ETC.)/CONCATENATION METHOD OF SEARCH CONDITIONS/··· |
| COMMON CONTENTS METADATA FORMAT INFORMATION | XML SCHEMA/··· |
| COMMUNICATION PROTOCOL INFORMATION | APPLICATION PROTOCOL INFORMATION (HTTP, ETC.)/IP VERSION/··· |
| ··· | |
| } | |

FIG.6

| ITEM NAME | VALUE (EXAMPLE) |
|---|---|
| for (i=0; i<ACCUMULATED KEYWORD COUNT; i++) { | |
| KEYWORD | "ABC" |
| EXTRACTION DATE AND TIME | 200X/01/01 00:00:00 |
| EXTRACTION-SOURCE CONTENTS METADATA ATTRIBUTE | title |
| EXTRACTION-SOURCE SERVICE | XX VIDEO DELIVERY SERVICE |
| for (j=0; j<EXTRACTION-SOURCE COMMON SEARCH CONDITION ATTRIBUTE COUNT; j++) { | COMMON SEARCH QUERY INFORMATION OF EXTRACTION SOURCE |
| COMMON SEARCH CONDITION ATTRIBUTE | genre |
| COMMON SEARCH CONDITION ATTRIBUTE VALUE | 0x01020222 (EX: COMMON GENRE CODE REPRESENTING "SPORTS") |
| } | |
| ... | |
| } | |

FIG.7

| ITEM NAME | VALUE (EXAMPLE) |
|---|---|
| for (i=0; i<EXECUTED SEARCH QUERY COUNT; i++) { | |
| RETRIEVAL START INDEX | 1 |
| NUMBER OF RETRIEVALS | 50 |
| TOTAL NUMBER OF HITS | 12000 |
| for (j=0; j<EXTRACTION-SOURCE COMMON SEARCH CONDITION ATTRIBUTE COUNT; j++) { | COMMON SEARCH QUERY INFORMATION OF EXTRACTION SOURCE |
| COMMON SEARCH CONDITION ATTRIBUTE | genre |
| COMMON SEARCH CONDITION ATTRIBUTE VALUE | 0x01020222<br>(EX: COMMON GENRE CODE REPRESENTING "SPORTS") |
| } | |
| RESPONSE TIME | 0.20 (sec) |
| EXECUTION DATE AND TIME | 200X/01/01 00:00:00 |
| ... | |
| } | |

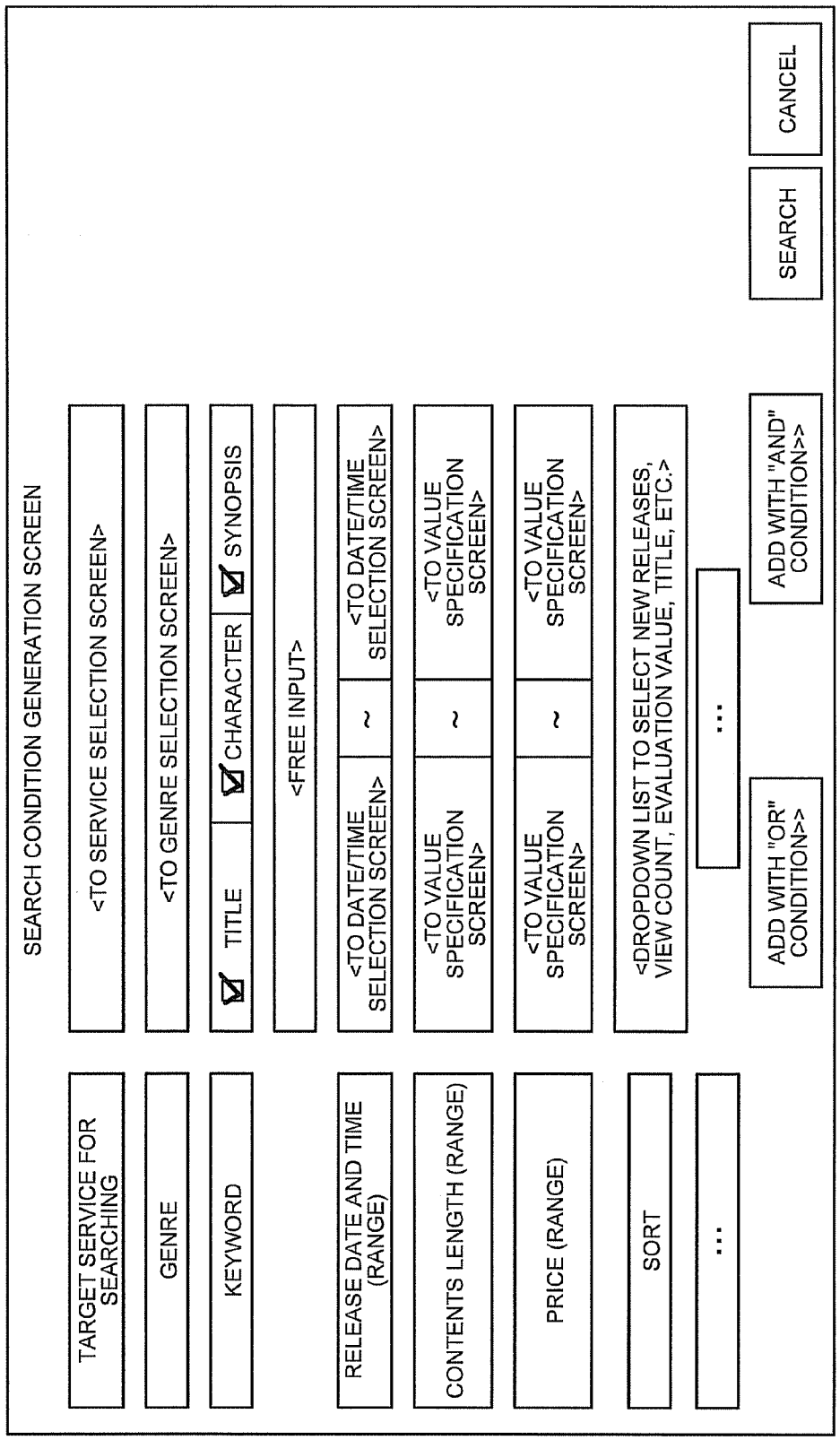

FIG.9

| ITEM NAME | SYNOPSIS (EXAMPLE) |
|---|---|
| mediaType | MEDIA TYPE (video) |
| mediaSubType | MEDIA SUBTYPE (programInfo) |
| for (i = 0; i < requestFieldSize; i++) { // requestField | TARGET METADATA ATTRIBUTE COUNT FOR RETRIEVAL (4) |
| field [i] | TARGET METADATA ATTRIBUTE NAMES FOR RETRIEVAL (name, synopsis, genre, imagePath) |
| } | |
| index | RETRIEVAL START INDEX(0) |
| count | NUMBER OF RETRIEVALS(100) |
| sortKey | SORT KEY (COMMON METADATA ATTRIBUTE NAME) (startDate) |
| sortOrder | SORT ORDER (DESC(=DESCENDING ORDER)) |
| for (i = 0; i < predicateBagSize; i++) { // predicateBag | NUMBER OF "OR" SETS OF COMMON SEARCH CONDITIONS (2) |
| for (j = 0; j < predicateSize; j++) { // predicate | NUMBER OF SEARCH CONDITIONS IN "OR" SETS (2) |
| key | COMMON SEARCH CONDITION ATTRIBUTE (Genre) |
| operation | OPERATION (=) |
| value | COMMON SEARCH CONDITION ATTRIBUTE VALUE (0x01010222(EX: COMMON GENRE CODE REPRESENTING "NEWS/REPORTING")) |
| } | |
| } | |

FIG.10

```
predicateBag[0].predicate[0].key="genre"
predicateBag[0].predicate[0].op="="
predicateBag[0].predicate[0].key="0x01010222" //(COMMON GENRE CODE
REPRESENTING NEWS)
predicateBag[0].predicate[1].key="genre"
predicateBag[0].predicate[1].op="="
predicateBag[0].predicate[1].key="0x01020222" //(COMMON GENRE CODE
REPRESENTING SPORTS)
predicateBag[1].predicate[0].key="keyword"
predicateBag[1].predicate[0].op="="
predicateBag[1].predicate[0].key="MAJOR LEAGUE"
predicateBag[2].predicate[0].key="keyword"
predicateBag[2].predicate[0].op="="
predicateBag[2].predicate[0].key="JAPANESE PLAYERS"
```

FIG.11

(genre="news" or genre="sports") and (keyword="MAJOR LEAGUE") and (keyword="JAPANESE PLAYERS")

FIG.12

| | | (a) | (b) | |
|---|---|---|---|---|
| COMMON SEARCH CONDITION ATTRIBUTE | SEARCH CONDITION ATTRIBUTE NAME IN SERVICE | COMMON SEARCH CONDITION ATTRIBUTE VALUE | SEARCH CONDITION ATTRIBUTE NAME IN SERVICE CORRESPONDING TO COMMON SEARCH CONDITION ATTRIBUTE | COMMON SEARCH CONDITION ATTRIBUTE VALUE IN SERVICE |
| keyword | VQ | -- | -- | -- |
| genre | Category | 0x01010222 (NEWS/REPORTING) | Category | News |
| | | 0x01020222 (SPORTS) | Category | Sports |
| | | 0x01020333 (SPORTS/BASEBALL) | VQ | "野球 OR baseball" |
| | | 0x01020444 (SPORTS/SOCCER) | VQ | "サッカー OR soccer" |
| | | 0x01030222 (MUSIC) | -- | -- |

FIG.13

```
predicateBag[0].predicate[0].key="genre"
predicateBag[0].predicate[0].op="="
predicateBag[0].predicate[0].key="0x01010222" //(COMMON GENRE CODE
REPRESENTING NEWS)
predicateBag[1].predicate[0].key="keyword"
predicateBag[1].predicate[0].op="="
predicateBag[1].predicate[0].key="MAJOR LEAGUE"
```

FIG.14

```
Category="News"&VQ="MAJOR LEAGUE"
```

FIG.15

```
predicateBag[0].predicate[0].key="genre"
predicateBag[0].predicate[0].op="="
predicateBag[0].predicate[0].key="0x01020333" //(COMMON GENRE CODE
REPRESENTING SPORTS/BASEBALL)
```

FIG.16

```
VQ="野球 OR baseball"
```

CONTENT RECEIVING APPARATUS WITH SEARCH QUERY GENERATOR

CROSS-REFERENCE TO RELATED APPLICATIONS

This application is a continuation of PCT international application Ser. No. PCT/JP2009/063605 filed on Jul. 30, 2009 which designates the United States; the entire contents of which are incorporated herein by reference.

FIELD

The present invention relates to a receiving apparatus.

BACKGROUND

In recent years, a number of services are available for delivering contents such as pictures or for sharing contents over the Internet. Among such services, some services have a single distributor providing contents of various genres; while some services are specialized in genres of expertise such as sports, news, music, movies, etc. It is anticipated that, in the future, such services will go on increasing. Besides, in addition to the Internet, services for providing high-quality pictures have also started over a closed IP network called NGN (Next Generation Network) that has bandwidth assurance. Thus, if the conventional broadcasting services such as terrestrial broadcasting services, BS broadcasting services, or CS broadcasting services are also taken into account; then the contents accessible to the users have explosively increased. Moreover, due to the increase in the capacity of memory devices and the decrease in the cost thereof; the local disks of AV devices, which reproduce pictures, have become capable of storing an enormous number of contents. Along with such diversification and ubiquitousness of services as well as with an explosive increase in the contents, it is becoming extremely difficult for the users to efficiently find out the intended contents. Given such a situation, a technology has been developed in which contents that are related to the selected contents are searched for in a local disk or over a network by referring to metadata of those contents, and then the display of contents is controlled (for example, JP-A No. 2008-227947 (KOKAI)).

However, in the technology disclosed in JP-A No. 2008-227947 (KOKAI), at the time of searching for contents over a network, there is a possibility that the contents cannot be retrieved depending on what type of services are available over the network. That is, as far as the search criteria such as acceptable search conditions, metadata formats, transmission protocols, searchable contents genres, or search formulae for searching contents or metadata; there can be a disparity between the services. Take the example of search conditions. It happens that a particular service allows a search by keywords only, but another service allows a search by keywords as well as a search by genres. Moreover, even among the services that allow a search by genres, it is often the case that the definitions of genres are not the same. Besides, it is often the case the services allowing a search by keywords implicitly point to full-text searching of metadata. However, there are some services which also allow a search by specification of titles, synopsis, keywords, or cast along with the specification of keywords. By taking into account such a variety among the services, if an inter-service search across a plurality of services is to be performed in a receiving apparatus that receives contents, the search formula for searching the intended contents needs to be incorporating the search criteria of all services. However, it is not an easy task to project, without any discrepancies, a search formula for searching the intended contents onto a search formula incorporating the search criteria of all services. Hence, when each of a plurality of services has different search criteria, the user may not be able to accurately search for the intended contents.

BRIEF DESCRIPTION OF THE DRAWINGS

FIG. 1 is a diagram illustrating a functional configuration of a receiving apparatus according to a first embodiment;

FIG. 2 is a diagram illustrating a data configuration of common metadata;

FIG. 3 is a diagram illustrating common metadata expressed in XML format;

FIG. 4 is a diagram illustrating a data configuration of reproduction history information or skipping history information;

FIG. 5 is a diagram illustrating a data structure of service information;

FIG. 6 is a diagram illustrating a data configuration of keyword information;

FIG. 7 is a diagram illustrating a data configuration of execution result information;

FIG. 8 is a diagram illustrating a screen for specifying search conditions;

FIG. 9 is a diagram illustrating a data configuration of a common search query;

FIG. 10 is a diagram illustrating common search conditions included in a common search condition list;

FIG. 11 is a diagram illustrating a common search condition expressed as a Boolean expression;

FIG. 12 is a diagram illustrating a configuration when an attribute conversion table and an attribute value conversion table are configured in an integrated manner;

FIG. 13 is a diagram illustrating common search conditions specified in a common search condition list;

FIG. 14 is a diagram illustrating a search query;

FIG. 15 is a diagram illustrating common search conditions specified in a common search condition list;

FIG. 16 is a diagram illustrating a search query;

DETAILED DESCRIPTION

Figure 17:
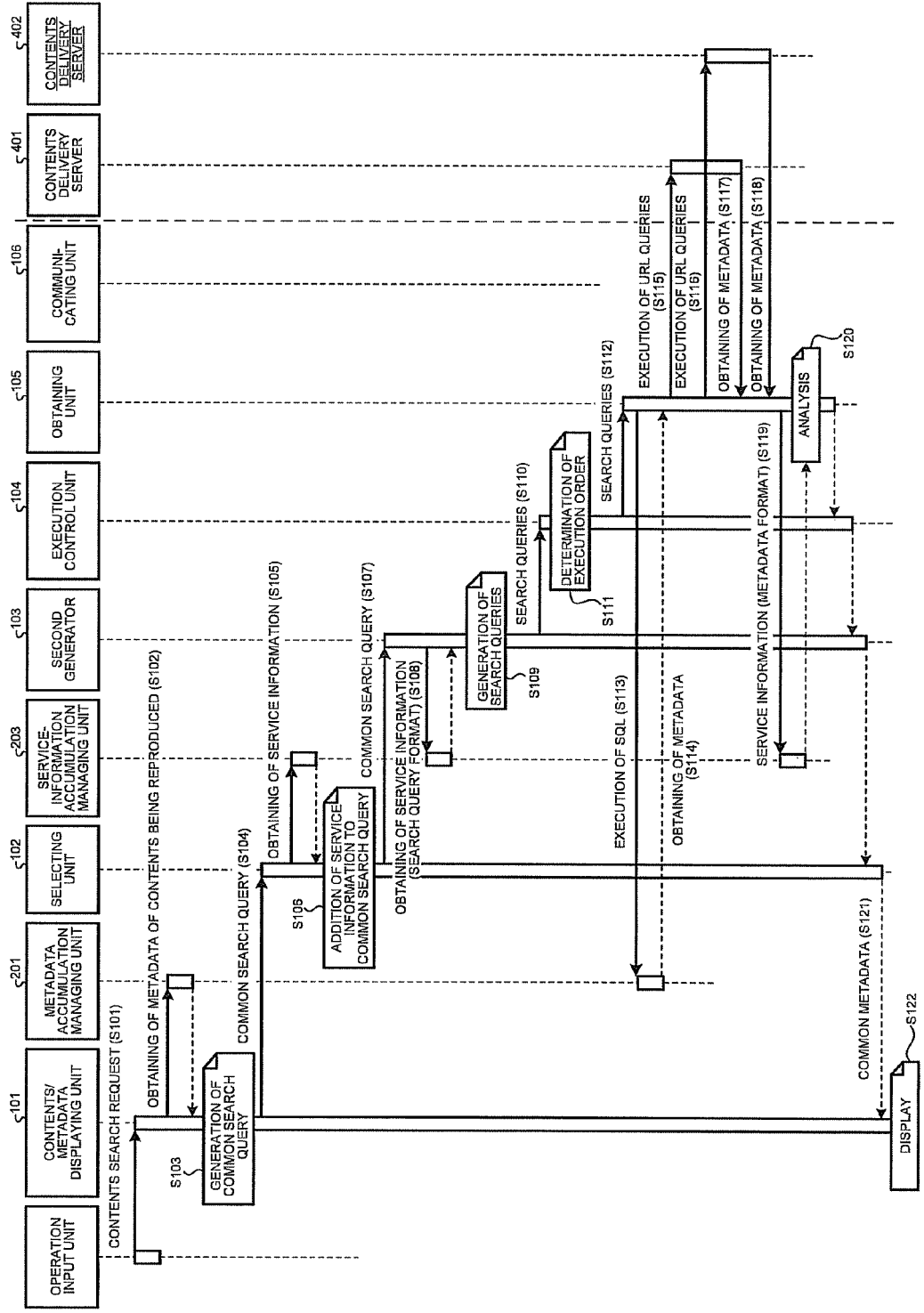
FIG. 17 is a flowchart for explaining the sequence of a metadata obtaining operation performed in the receiving apparatus.

According to an embodiment, a receiving apparatus includes a memory, a first generator, a second generator, a transmitter, a receiver. The memory is configured to store service information including search criteria set in a memory device and a connection method for connecting with the memory device. The memory device stores attribute information including attributes of contents in a searchable condition and is connectable via a network. The first generator is configured to generate a common search query that is a search query expressing search conditions used in searching contents and that includes at least a pair of a common search condition attribute and a common search condition attribute value. The common search condition attribute has a common mode of expression of a search condition attribute that represents any of the attribute. The common search condition attribute value is a value which can be taken by the common search condition attribute. The second generator is configured to generate a search query according to the search criteria specified in the service information with the use of the generated common search query. The transmitter is configured to transmit the generated search query to the memory device based on the connection method specified in the service information. The receiver is configured to receive, from the memory device, the attribute information obtained as a result of executing the search query. The attribute information is metadata. The service information further includes a metadata attribute that is an attribute represented by the metadata which can be provided as a result of executing the search query and a metadata description format that is a description format of the metadata, includes a search condition attribute representing the metadata attribute that is specifiable as a search condition in the search query, includes a search query description format representing a description format of the search query that can be processed by the memory device, and includes a metadata attribute conversion table representing a correspondence relationship between the metadata attributes, the search condition attributes, and the common search condition attributes. The second generator generates the search query that includes the search condition attributes and that is written in the search query description format. The search condition attributes is obtained by conversion of the common search condition attributes included in the common search query with the use of the metadata attribute conversion table.

Exemplary embodiments of a receiving apparatus according to the present invention are described below in detail with reference to the accompanying drawings.

First Embodiment

First of all, the explanation is given about a hardware configuration of the receiving apparatus according to a first embodiment. The receiving apparatus according to the first embodiment has the hardware configuration of a normal computer that includes a controller such as a CPU (Central Processing Unit) for controlling the apparatus in entirety; a main memory such as a ROM (Read Only Memory) or a RAM (Random Access Memory) for storing a variety of data or storing various programs; an auxiliary memory such as an HDD (Hard Disk Drive) or a CD (Compact Disk) drive device for storing a variety of data such as contents or storing various programs; and a bus for interconnecting these components. Besides, to the receiving apparatus are connected, in a wired or wireless manner, a display unit for displaying information; an operation input unit such as a keyboard, a mouse, or a remote controller (remote) for receiving input of instructions from the user; and a communication I/F (interface) for controlling communication with external devices. Herein, the communication with external devices is performed via a network such as a LAN (Local Area Network), an intranet, Ethernet (registered trademark), the Internet, a WAN (Wide Area Network), or an NGN (Next Generation Network) that is a closed network having bandwidth assurance. The receiving apparatus is implemented as, for example, a personal computer, a digital television, a hard disk recorder, an STB (Set Top Box), or a mobile device such as a cellular phone. Such a receiving apparatus obtains contents that are stored in the auxiliary memory, or obtains contents from an external device via a network, or obtains metadata that represents attribute information including the attributes of the contents and then refers to the metadata for obtaining the contents; and then reproduces the contents. Meanwhile, in the first embodiment, the contents are assumed to represent pictures. However, alternatively, there can be various other types of contents that represent music, pictures, books, etc.

Explained below are various functions that are implemented in the above-mentioned hardware configuration when the CPU of the receiving apparatus runs various programs stored in the main memory or the auxiliary memory. FIG. 1 is a diagram illustrating a functional configuration of a receiving apparatus 100. Herein, the receiving apparatus 100 includes a contents/metadata displaying unit 101, a selecting unit 102, a second generator 103, an execution control unit 104, an obtaining unit 105, a communicating (transmitting/receiving) unit 106, a metadata accumulation managing unit 201, a contents-viewing/skipping-history accumulation managing unit 202, a service-information accumulation managing unit 203, a keyword generation/accumulation managing unit 204, a search-query-execution-history accumulation managing unit 205, and a contents/metadata-displaying-unit-attribute-information accumulation managing unit 206. Herein, the contents/metadata displaying unit 101, the selecting unit 102, the second generator 103, the execution control unit 104, the obtaining unit 105, and the communicating unit 106 are generated in the main memory such as the RAM when the CPU runs the programs. The metadata accumulation managing unit 201, the contents-viewing/skipping-history accumulation managing unit 202, the service-information accumulation managing unit 203, the keyword generation/accumulation managing unit 204, and the search-query-execution-history accumulation managing unit 205 constitute a database management system that is built in the auxiliary memory. Such a system can either have XML databases or have relational databases. Moreover, it is not necessary to build only a single database management system. Rather, a plurality of database management systems can be built by the combined use of SQLite3, Oracle, MySQL, and the like. Besides, the database management system can be built in a single physical auxiliary memory, or a plurality of physical auxiliary memories such as NAS or SAN can be used as the database management system. Besides, instead of a database management system, if the accumulation managing units include means for obtaining unit information (entry) that is the data stored in the respective accumulation managing units; then the accumulation managing units can be merely configured with a group of files in the CSV format or the like.

The communicating unit 106 is connected to a network 301 and functions as a network interface for communicating with contents delivery servers 401 and 402 that are also connected to the network 301. In the first embodiment, although only a single network interface is provided, it is also possible to have a plurality of network interfaces. The contents delivery servers 401 and 402 are memory devices for storing contents or storing metadata of the contents in a searchable condition, and have interfaces for sending the contents or the metadata to the receiving apparatus 100 via the network 301. The interfaces are assumed to have a URL (Uniform Resource Locator) including the character string of a search query and are assumed to send the metadata in hyper text that is displayed on a Web browser written in HTML (HyperText Markup Language). Alternatively, the interfaces can be configured to send the metadata in XML (Extensible Markup Language) documents of the RSS format. Still alternatively, the interfaces can be configured to send information on a search query and on metadata, which represents the search result of executing that search query, using SOAP (Simple Object Access Protocol) that makes use of the request body and the response body of HTTP. In the first embodiment, it is assumed that the contents delivery servers 401 and 402 send the metadata by performing unicast communication of text format based on the TCP/HTTP protocol. However, it is not the only possible case. For example, a search query and the metadata thereof can also be present in the binary format. Besides, the communication between the receiving apparatus 100 and the contents delivery servers 401 and 402 is not limited to the unicast communication of text format based on the TCP/HTTP protocol. Alternatively, the metadata can also be sent using multicast communication. In that case, the receiving apparatus 100 makes use of IMGP (Internet Group Management Protocol) or MLD (Multicast Listener Discovery), and performs signaling communication to participate in or withdraw from the multicast address to which the metadata is delivered. Meanwhile, in FIG. 1, although only the two contents delivery servers 401 and 402 are illustrated, it is also possible to connect a larger number of contents delivery servers to the network 301 for communicating with the receiving apparatus 100. In the first embodiment, with the aim of making it easier to explain the exemplary case of having different search criteria for searching the contents, the explanation is given with reference to only the two contents delivery servers 401 and 402.

The metadata accumulation managing unit 201 stores therein, as common metadata, the metadata that differs from service to service; and manages the common metadata by means of controlling the operations of storing, accessing, and deletion with respect to the common metadata. Herein, a service represents an entity that stores contents or the metadata of those contents in a searchable condition. Thus, with reference to FIG. 1, not only the contents delivery servers 401 and 402 represent services, but also the metadata accumulation managing unit 201 that stores therein the metadata represents a service. The common metadata points to the metadata having the same display format in the receiving apparatus 100. For example, in the case of contents representing pictures; the TV Anytime association has developed standard specifications for a metadata description format, which can be used as the common metadata. Alternatively, a minimal set of metadata can be defined for the contents/metadata displaying unit 101 to use in display and in internal control, and that set of metadata can be used as the common metadata. A minimal set of metadata includes, for example, a contents identifier for identifying contents; a title; a summary (synopsis); a length of contents; a date of release/broadcast; information regarding age limit; a genre; a keyword (tag); and a service identifier for identifying the source service. As far as the genres are concerned; for example, subdivisions such as "sports", "entertainment", "economics", or the like have genre codes assigned thereto in advance in a specifiable manner. Meanwhile, as the common metadata, it is also possible to obtain and use the union of sets of contents included in all target services.

Meanwhile, in the case when the metadata accumulation managing unit 201 stores therein the metadata obtained from a plurality of services as the common metadata, it is necessary to include at least the service identifiers in the common metadata. Herein, the common metadata can be the metadata obtained from the contents delivery servers 401 and 402, or can be generated by the metadata accumulation managing unit 201 from the metadata obtained from the contents delivery servers 401 and 402. For example, when the metadata includes a synopsis, the metadata accumulation managing unit 201 performs morphological analysis of the sentences in the synopsis; extracts information regarding keywords or character names; and generates common metadata in which the extracted information is included and stores that common metadata.

FIG. 2 is a diagram illustrating a data configuration of the common metadata. As illustrated in FIG. 2, the common metadata is configured from three values, namely, a retrieval start index (from), a number of retrievals (count), and a total number of retrievals (total); and configured from common contents/metadata corresponding to the count. Moreover, each set of the common contents/metadata is configured from two types of common metadata attributes, namely, common metadata attributes that are independent of media type/media subtype (described later) and common metadata attributes that are dependent on media type/media subtype. The retrieval start index (from), the number of retrievals (count), and the total number (total) indicate the number of sets of metadata (count) starting from a particular set of metadata (from) from among the total number of contents (total) corresponding to a common search query (described later). Given below is the explanation of each common metadata attribute that constitutes the common contents/metadata. Herein, the common contents/metadata includes the following attributes: media type (mediaType), media subtype (mediaSubType), contents identifier (contentId), contents name (name), contents explanation (synopsis), and contents keyword (keyword).

The media type (mediaType) is information representing a type of contents such as video, music, books, photographs, etc. The common metadata can be configured either to include only a single particular media type or to include a value obtained by performing OR concatenation of a plurality of media types. In the example illustrated in FIG. 2, the media type is video (video). The media subtype (mediaSubType) is information that is defined for each media type and that represents a granular level of the type of contents. When the media type is video, the media subtype can be program information, group information representing a set of programs, chapter information (information representing a single point on the time-line in a program), segmentation information (information representing a single interval on the time-line in a program), or license information. In the example illustrated in FIG. 2, the media subtype is program information (programInfo).

Along with the media type (mediaType) and the media subtype (mediaSubType); contents identifier (contentId), contents name (name), contents explanation (synopsis), and contents keyword (keyword) are also defined as the common metadata attributes independent of media type/media subtype. The contents identifier (contentId) is an identifier for identifying the contents. The contents name (name) represents the name assigned to the contents. The contents explanation (synopsis) represents the summary or the characteristics of the contents. The contents keyword (keyword) represents keywords included in the contents. The common metadata attributes (described later) correspond to the media type "video" and the media subtype "programInfo". In the example illustrated in FIG. 2, the program information includes a video format (format), an age limit (parentalRate), a genre (genre), a contents length (duration), a release/broadcast starting date and time (startDate), a release/broadcast ending date and time (endDate), and a thumbnail image (imagePath).

Meanwhile, the common metadata can be an object such as a structure or a class in a software program, or can be expressed in, for example, the XML (eXtensible Markup Language) format as illustrated in FIG. 3.

When the media type is video, the program information is not limited to information including the video format (format), the age limit (parentalRate), the genre (genre), the contents length (duration), the release/broadcast starting date and time (startDate), the release/broadcast ending date and time (endDate), and the thumbnail image (imagePath) as described above. Rather, the program information can include a greater number of common metadata attributes. For example, as illustrated in FIG. 3, when the common metadata is expressed in the XML format, the configuration can be such that the XML schema representing the common metadata can be edited so as to dynamically modify the common metadata attributes that constitute the common contents/metadata. Moreover, in the first embodiment, the configuration is such that the common metadata attributes included in the common contents/metadata are defined with two values of media type/sub-media type. However, the definition need not have two values, but can also have a single value. Besides, if the media type to be used remains limited to program information related to video, it is also possible to have a configuration in which the common metadata attributes are not defined with the media type/sub-media type.

Returning to the explanation with reference to FIG. 1, the contents-viewing/skipping-history accumulation managing unit 202 stores therein reproduction history information, which includes the history of contents reproduced by the contents/metadata displaying unit 101, and skipping history information, which indicates the history of skipped reproduction; and manages such information by controlling the storing, access, and deletion with respect to that information. Herein, skipping represents a case when contents that are being reproduced are stopped from getting reproduced within a definite period of time. The reproduction history information as well as the skipping history information includes the contents identifier of the target contents for reproduction. Meanwhile, when the reproduction history information and the skipping history information are to be managed together in the same table, the reproduction history information as well as the skipping history information further includes type information indicating whether the information type points to the reproduction history information or the skipping history information. In contrast, when the reproduction history information and the skipping history information are to be managed in separate tables, the reproduction history information and the skipping history information may not include the type information. Moreover, the reproduction history information as well as the skipping history information further includes a service identifier that is used in identifying the services at the source from which the target contents for reproduction are obtained. However, when the metadata stored in the metadata accumulation managing unit 201 includes the service identifier, the reproduction history information and the skipping history information may not include the service identifier.

FIG. 4 is a diagram illustrating a data configuration of the reproduction history information or the skipping history information. In FIG. 4, "viewing/skipping flag" represents type information that indicates whether the information type is the reproduction history information or the skipping history information, and "event occurrence date and time" represents the date and time of either reproducing the contents or skipping the contents being reproduced.

The service-information accumulation managing unit 203 stores therein, on a service-by-service basis, service information that includes search criteria regarding the target service in which the receiving apparatus 100 searches for contents and that includes a connection method (communication protocol, access path, etc.) for establishing connection with that service. The service-information accumulation managing unit 203 manages such service information by controlling the operations of storing, accessing, and deletion of the service information. As the information representing search criteria, the service information includes information about the interfaces that are used in obtaining metadata at the time of searching for the contents provided by the service. More particularly, the service information is defined on a service-by-service basis, and includes attributes (search condition attributes) representing metadata attributes that are specifiable as search conditions in search queries, and includes values that can be taken by the search condition attributes (search condition attribute values) (unit information, genre, age limit, list of valid values such as evaluation values, etc.); includes a metadata format representing the description format of metadata that can be provided by the service as the result of executing search queries; includes metadata attributes representing attributes of the metadata, and includes values that can be taken by the metadata attributes (metadata attribute values) (similar to the search condition attributes; unit information, genre, age limit, list of valid values such as evaluation values, etc.); and includes a search query format representing the description format of search queries that can be processed by the service. As the search query format, it is also possible to include search rules such as concatenation methods of search conditions. As the metadata format, metadata attribute names corresponding to the common metadata attributes and metadata attribute values corresponding to the common metadata attributes can be maintained in the form of a conversion table or can be maintained by providing the analysis processing in a script language such as Java (registered trademark) Script, Python, Perl, Ruby, or the like. Meanwhile, the service information can also include an attribute conversion table that is used in converting the common search condition attributes as well as converting the search condition attributes and the metadata attributes of each service into the common metadata attributes. Similarly, the service information can also include an attribute value conversion table that is used in converting the search condition attributes defined on a service-by-service basis into common search condition attributes. Herein, the common search condition attributes point to the search condition attributes having the same display format in the receiving apparatus 100. The term "common" is used to integratedly deal with the expressions of the search condition attributes or the search condition attribute values that differ from service to service. The attribute conversion table can either be a correspondence table or be a program written in a script language or the like that represents the correspondence relation between the common search condition attributes, the search condition attributes and the metadata attributes of each service, and the common metadata attributes. In an identical manner, the attribute value conversion table can either be a correspondence table or be a program written in a script language or the like that represents the correspondence relation between the search condition attributes defined on a service-by-service basis and the common search condition attributes. The manner in which the attribute conversion table and the attribute value conversion table are put to use is described later.

Besides, the service information can further include a variety of information such as service identifiers used in identifying the services; names of the services; display attributes such as icons representing the services; authentication attributes such as users IDs or passwords input by the users of the receiving apparatus 100 for using the services; subdivisions of genres (associated genres) of the contents supported by the services; and quality of the contents. Meanwhile, when it is said that a service supports contents; it means that the service stores therein the contents and the corresponding metadata, and is able to provide those contents to the receiving apparatus 100. Moreover, instead of the associated genres, the service information can include subdivisions of the genres of those contents which are not supported by the corresponding service. Furthermore, when a common search condition attribute value of the common search condition attribute corresponds to all contents having attributes thereof specified in the metadata that is stored in a service which has a connection method thereof specified in the service information, then the service information can further include the pair of that common search condition attribute and the common search condition attribute value. For example, regarding a service that stores the metadata of contents related to news; under the assumption that the genre "news" can be applied in an implicit manner, that particular genre and a genre code representing "news" is included in the service information. Moreover, the service information can also include the following information: address information such as the URLs of published portal sites; IP address families put to use; protocols; and protocol-dependent information (HTTP methods or HTTP extension headers that are used). In addition, the service information can further include the following information that is statistically obtained from the information stored in the search-query-execution-history accumulation managing unit 205 (described later): average response time information that includes the average of response time; average size information that includes the average of the sizes of metadata; and average total count information that includes the average of the number of sets of metadata obtained when a particular search condition such as a genre is specified.

FIG. 5 is a diagram illustrating a data structure of service information. As the connection method for establishing a connection with a service, the service information illustrated in FIG. 5 includes a service path. Moreover, when a plurality of services is configured to have a hierarchical relationship therebetween, the service information includes hierarchical relationship information that is used in identifying the hierarchical relationship. For example, regarding the services in a parent-child relationship, the service information of child services (referred to as dependent services) includes the service identifiers of the services at the respective parent levels (referred to as parent services). That corresponds to the hierarchical relationship information. Regarding this, as described later in detail with respect to a receiving apparatus 100' according to a second embodiment, when a plurality of local database services is present in a searchable manner; then, even if the metadata is provided from a single contents delivery server, there is a possibility that the metadata formats are not unified inside the contents delivery server. Even in such a case, it is possible to implement a hierarchical configuration. More particularly, in a service that provides the metadata only in the form of HTML documents of a portal site; when the layout is different for each category (genre), dependent services can be defined on a genre-by-genre basis. When a search query is generated in actuality, the service-information accumulation managing unit 203 can be configured to additionally manage the information that is necessary at the time of mapping the dependent services to the respective parent services. For example, in a database management system; for example, that information corresponds to the database names used to attach the main database. In the case of a WebAPI; for example, that information can be assumed to be relative path information that is obtained from route URL information included in main service information. Meanwhile, the service information can be stored in advance in the service-information accumulation managing unit 203. Alternatively, when a server that is present in the network 301 performs uniform management of the service information of a service that can be considered to be the target service for searching by the receiving apparatus 100; then the receiving apparatus 100 can accordingly obtain the service information from that server and then store it in the service-information accumulation managing unit 203. Still alternatively, the obtaining unit 105 can obtain the service information from the contents delivery servers 401 and 402 corresponding to the services and then store it in the service-information accumulation managing unit 203.

The keyword generation/accumulation managing unit 204 stores therein keyword information that represents keywords extracted by the obtaining unit 105 from the metadata, and manages the keyword information by means of controlling the operations of storing, accessing, and deletion with respect to the keyword information. Alternatively, a server (not illustrated), which has an interface for providing keywords appended with statistical information or weight information to the receiving apparatus 100, can be disposed in the network 301 so that the keyword generation/accumulation managing unit 204 can obtain the keyword information including those keywords from the server and manage that keyword information. Meanwhile, the keyword information can also include the date of extraction of the keywords (extraction date and time) or the genre codes representing the genres belonging to the contents including the keywords. In that case, for example, the keyword information can be configured in such a way that it becomes possible to extract the talked-about keywords from the contents on a genre-by-genre basis or to extract the keywords that were of high interest during a certain period (for example, in the past one week). For example, the statistical information represents the frequency of appearance of the keywords, which appear in the topics on a genre-by-genre basis; while the weight information represents that higher the interest, greater is the weight. Thus, by managing the keyword information along with such statistical information or weight information; when a search by genre is to be simulatedly performed with respect to a service that does not hold genres in the search condition attributes, the second generator 103 (described later) can obtain the keyword information including those genres from the keyword generation/accumulation managing unit 204.

FIG. 6 is a diagram illustrating a data configuration of keyword information. As illustrated in FIG. 6, the keyword information includes keyword, the names of services that store therein the contents from which the keywords are extracted, the common search condition attributes, and common search condition attribute values. In FIG. 6, the common search condition attribute represents, for example, "genre"; and the common search condition attribute value represents a genre code for "sports".

The search-query-execution-history accumulation managing unit 205 stores therein execution result information that includes the result of execution of search queries executed by the obtaining unit 105, and manages the execution result information by means of controlling the operations of storing, accessing, and deletion with respect to the execution result information. The execution result information includes, for example, the latency time (response time) from the start of executing a search query to the reception of metadata as the response and includes information regarding the number of received sets of metadata. Moreover, the search-query-execution-history accumulation managing unit 205 obtains statistical information from execution history information, refers to the statistical information and extracts the attribute information of the service for which the search query was executed, and stores the attribute information as service information in the service-information accumulation managing unit 203. Herein, for example, the statistical information represents the average response time from the execution of the search query to the reception of metadata as the response or represents the number of contents that match with the search conditions specified in a search query and that are retained on a service-by-service basis. Moreover, the attribute information of services indicates, for example, which particular service retains only the contents belonging to particular genres or which service does not retain the contents belonging to particular genres.

FIG. 7 is a diagram illustrating a data configuration of execution result information. As illustrated in FIG. 7, the execution result information includes the number of obtained sets of metadata, the common search condition attributes, the common search condition attribute values, the response time, and the date and time of executing the search queries (execution date and time). In FIG. 7, it is illustrated that, at the time of executing a search query, for example, "genre" is specified as the common search condition attribute; and a genre code representing "sports" as a subdivision of that genre is specified as the common search condition attribute value.

The contents/metadata-displaying-unit-attribute-information accumulation managing unit 206 stores therein attribute information (hereinafter, referred to as display attribute information) that is related to the display at the time when the contents/metadata displaying unit 101 displays the contents or the metadata on the display unit, and manages the display attribute information by means of controlling the operations of storing, accessing, and deletion with respect to the display attribute information. Herein, the display attribute information includes screen size information indicating the size of a screen, aspect ratio information indicating the aspect ratio, and format information indicating the format of the contents displayable on the display unit. Besides, when the contents/metadata displaying unit 101 has a function of controlling the display on a user-by-user basis, the display attribute information can also include information, such as age limit information indicating the age limits, related to the display control on a user-by-user basis.

The contents/metadata displaying unit 101 includes a first generator 101*a* that provides a GUI (Graphical User Interface) for controlling the display of information on the display unit and for processing the operations that are input by the user via the operation input unit as control signals. More particularly, the contents/metadata displaying unit 101 displays the metadata on the display unit; receives the input of operations from the user via the operation input unit; identifies the contents selected according to the operation input; and reproduces the contents by means of displaying on the display unit. Moreover, the contents/metadata displaying unit 101 stores, in the contents-viewing/skipping-history accumulation managing unit 202, the reproduction history information that includes the history of reproduced contents or the skipping history information that indicates the history of skipped reproduction along with operation history thereof. Furthermore, the contents/metadata displaying unit 101 generates a screen that enables the user to expressly generate a common search query, and displays that screen on the display unit. Herein, a common search query has one or more common search conditions for searching the contents intended by the user, and represents search queries having the same mode of expression in the receiving apparatus 100. As described above, the term "common" is used to integratedly deal with the expressions of the search condition attributes or the search condition attribute values that differ from service to service.

FIG. 8 is a diagram illustrating a screen for specifying search conditions. In the screen illustrated in FIG. 8, as the search conditions, the user is allowed to specify a target service for searching; a genre code representing the genre of the target contents for searching; a keyword; a release date and time (release/broadcast starting date and time or release/broadcast ending date and time); the contents length (duration); or reordering (sorting conditions) via the operation input unit. Herein, the sorting conditions are processing conditions used to sort the metadata obtained as the result of a search. With respect to all of the common metadata attributes, the sorting conditions can be specified either in ascending order or in descending order. For example, sorting can be performed on the basis of titles, genres, ending date, duration, view counts, evaluation values, or the like. In this way, the specified search conditions can include various processing conditions such as the sorting conditions.

In response to the operation input received from the user, the first generator 101*a* of the contents/metadata displaying unit 101 generates a common search query that includes the search conditions for searching the contents related to the contents being reproduced or that includes the search conditions expressly specified by the user on the screen illustrated in FIG. 8, and outputs the common search query to the selecting unit 102 or to the second generator 103.

Explained below with reference to FIG. 9 is a data configuration of a common search query. As illustrated in FIG. 9, a common search query includes a media type (mediaType), a media subtype (mediaSubType), names of target common metadata attributes for retrieval (target metadata attribute names for retrieval) (requestField), retrieval range (retrieval start index (from) and number of retrievals (count)), a sort key (sortKey), a sort order (sortOrder), and a common search condition list (predicateBag). The target metadata attribute names for retrieval (requestField) are expressed in a list format and, for example, in the example illustrated in FIG. 9, four values of name, synopsis, genre, and imagePath are listed. It indicates that, as the metadata attributes of the program information (video.programInfo) when the media type is "video"; only the contents name (title), the synopsis, the genre, and the thumbnail image are obtained. The sort key (sortKey) is a common metadata attribute name used as a sorting condition in sorting. The sort order (sortOrder) is a sorting condition indicating the order of sorting. In the example illustrated in FIG. 9, it is specified that the sort order is in descending order (DESC), that is, in the order of new releases; and is specified that the sort key is the release/broadcast starting date and time (startDate) of the common metadata attributes. Moreover, in the example illustrated in FIG. 9, the common search condition list (predicateBag) is expressed in the form of a list of OR sets of the common search conditions, and the relationship between a plurality of common search conditions is expressed in the form of Boolean expressions. A common search condition (predicate) constituting the common search condition list (predicateBag) includes three values, namely, a common search condition attribute name (key), an operation (operation), and a common search condition attribute value (value). In the common search condition attribute name, a common metadata attribute name is specified. The "operation" expresses the relationship between the common search condition attribute name and the common search condition attribute value using an inequality sign such as "=", "!=", "<", "≤", ">", or "≥". Meanwhile, in the "operation", it is possible not only to specify an inequality sign but also to define a reserved keyword such as "LIKE" representing a partial match in SQL.

For example, assume that the values as illustrated in FIG. 10 are set in the common search condition list (predicateBag) and in the common search condition (predicate) included in the common search condition list (predicateBag). In this example, as an common search condition attribute name (key), "genre" representing the genre is specified; and as the common search condition attribute value (value) thereof, a common genre code ("0x01010222") representing "news/reporting" is specified. Meanwhile, the genre codes having the same mode of expression in the receiving apparatus 100 are referred to as common genre codes. Besides, as the common search condition attribute name (key), "keyword" representing the keyword is specified; and as the common search condition attribute values (value) thereof, "major league" and "Japanese players" are specified. Such a common search condition indicates that those contents are searched which have "news" or "sports" as their genre and which include "major league" and "Japanese players" as keywords. Such a common search condition can be expressed in the form of a Boolean expression as, for example, illustrated in FIG. 11.

In the first embodiment, the common search condition list (predicateBag) is expressed in the form of a list of OR sets of the common search conditions, and the OR sets are subjected to AND concatenation. However, the configuration of a common search query is not limited to such a configuration. Rather, it is also possible to have a configuration in which, as in the case of SQL, AND sets or OR sets can be combined in a multistage manner. That is, it is also possible to have a configuration that enables implementation of more flexible Boolean expressions. Moreover, as in the case of genre codes described above, regarding the common search condition attributes for which a certain number of data sets that are expressible as enumeration can be taken as values, it is also possible to define a common code set.

Returning to the explanation with reference to FIG. 1, the selecting unit 102 obtains the common search query generated via the GUI (for example, via the screen illustrated in FIG. 8) that is provided by the contents/metadata displaying unit 101; refers to the service information stored in the service-information accumulation managing unit 203; and, when the common search condition attributes specified in the common search query include a genre, selects a service that has the service information including associated genres equivalent to the common search condition attribute values (herein, the common genre codes). For example, in a common search query, if "Genre" is included as the common search condition attribute and if "news/reporting" is included as the common search condition attribute value of that common search condition attribute; then the selecting unit 102 refers to the associated genres included in the service information illustrated in FIG. 3 and, if one of the associated genres includes a subdivision of genres corresponding to a common search condition attribute value, selects the service of that service information as the target service for searching. In contrast, if none of the associated genres include a subdivision of genres corresponding to a common search condition attribute value, the selecting unit 102 does not select the service having that service information as the target service for searching. Moreover, if the genre is not included as a common search condition attribute name, a common metadata attribute name is specified.

Besides, regarding the contents displayed on the display unit by the contents/metadata displaying unit 101; the selecting unit 102 extracts keywords from the metadata of those contents and generates a common search query by combining the common search condition attributes such as keywords or genres in those contents; refers to the service information stored in the service-information accumulation managing unit 203; and selects a service that corresponds to at least one of the common genre codes representing the common search condition attribute values corresponding to "Genre" from among the common search condition attributes and that has the service information including genre subdivisions as associated genres. The common search query can be generated in response to the operation input of the user received through the operation input unit or can be generated at some particular timing. Meanwhile, the selecting unit 102 can also select more than one service. In that case, based on the degree of matching of the common search condition attribute values or the usage frequencies of the services, the selecting unit 102 can perform weighting of the selected services and give out priority information. Herein, the degree of matching can be determined, for example, from a simple match count among a plurality of common condition attribute values such as common genre codes, video formats, average contents length information, or price range information in the case of fee-based services. Alternatively, the degree of matching can be determined by calculating the extent of matching (in a simplistic form, by calculating the difference in the average contents length information or the difference in the price range information described above). In order to calculate the usage frequencies of services, the reproduction history information or the skipping history information stored in the contents-viewing/skipping-history accumulation managing unit 202 is referred to. Alternatively, it is also possible to have an upper limit for the number of selectable services so that the services over the upper limit are not selected. In that case, the services can be selected on the basis of the above-mentioned priority information. The service information of the selected services can either be added as a search condition in the common search query or be treated separately from the common search query.

The second generator 103 obtains, via the selecting unit 102, the common search query output by the contents/metadata displaying unit 101, and generates a search query with respect to each target service for searching by referring to the common search query. At that time, the second generator 103 can express the common search query in the form of a Boolean expression of product of sums of the common search conditions and, in the case of generating a search query with respect to a service associated with the database management system, can use the Boolean expression without modification as a constraint clause in an SQL statement. Moreover, when the contents delivery servers 401 and 402 are providing, as a service, a commonly-used basic search function in a WebAPI or the like; the second generator 103 can expand the Boolean expression of product of sums described above in a product-sum type expression and generate a search query in each product term. Meanwhile, as a target service for searching, in the case when the selecting unit 102 is able to select a service, the selected service becomes the target service for searching. However, if the selecting unit 102 is not able to select a service or if the common search query is directly obtained from the contents/metadata displaying unit 101, then the second generator 103 can generate a search query with respect to all of the services for which that service information is stored in the service-information accumulation managing unit 203; or can randomly select a predetermined number of services and generate a search query for each of the selected service; or can select the services by referring to the usage frequencies of services, which are obtained from the reproduction history information or the skipping history information stored in the contents-viewing/skipping-history accumulation managing unit 202, and generate a search query for each of the selected services; or can select the services that are selected as the target services for searching by the user by means of an operation input from the operation input unit and generate a search query for each of the selected services. At the time of generating a search query, the second generator 103 refers to the attribute conversion table expressing the correspondence relationship between the common search condition attributes and the search condition attributes, and refers to a search condition attribute value conversion table expressing the correspondence relationship between the common search condition attribute values and the search condition attribute values; and generates search queries from the common search query according to the search query format specified in the service information and thus converts the common search query into search query consistent with the search criteria of the services.

Given below is the explanation about the method of conversion using the attribute conversion table and the attribute value conversion table. FIG. 12 is a diagram illustrating a configuration when the attribute conversion table and the attribute value conversion table are configured in an integrated manner. In FIG. 12, (a) represents the attribute conversion table and (b) represents the attribute value conversion table. Herein, the common metadata is assumed to have the data configuration as illustrated in FIG. 2; the common search query is assumed to have the data configuration as illustrated in FIG. 9; and the service information is assumed to have the data configuration as illustrated in FIG. 5. FIG. 13 is a diagram illustrating the common search conditions specified in the common search condition list (predicateBag). Regarding the common search conditions illustrated in FIG. 13, the second generator 103 converts "genre" into "Category" and converts "keyword" into "VQ" based on the search condition attributes included in the service information and based on the attribute conversion table illustrated in (a) of FIG. 12. Moreover, based on the search condition attribute values included in the service information and based on the attribute value conversion table illustrated in (b) of FIG. 12, the second generator 103 converts the common genre code ("0x01010222") representing "news/reporting" into a character string "news". Then, the second generator 103 generates a search query as illustrated in FIG. 14.

Meanwhile, when the search condition attribute value corresponding to a common genre code specified as the common search condition is not present in the service, it can be an option to not include that common genre code as a search condition or to substitute that common genre code by a keyword representing the character string equivalent to the common genre code. For example, as an example of a search by genre, it is assumed that there is a common search condition as illustrated in FIG. 15, but that the search condition attribute value corresponding to a common genre code ("0x0102333") representing sports/baseball does not exist. In this case, based on the attribute value conversion table illustrated in (b) of FIG. 12, the second generator 103 obtains the search attribute name and the search attribute value corresponding to the common genre code ("0x0102333") representing sports/baseball; and, in this example, converts them into "VQ" and "野球 OR baseball", respectively. That is, the second generator 103 replaces the search by common genre code with the search by keyword and generates a search query as illustrated in FIG. 16.

Meanwhile, it can also happen that the search condition attribute name and the search condition attribute value corresponding to a common genre code do not exist. For example, regarding a common genre code ("0x01030222") representing music, no substitutable keyword is present. Hence, in the attribute value conversion table illustrated in (b) of FIG. 12, a null value is specified indicating the facts that the corresponding search condition attribute name and the corresponding search condition attribute value do not exist. In this case, on the display unit, the second generator 103 can display a message so as to inform the user that the search query cannot be generated using that common genre code. Alternatively, from among the keywords represented by the keyword information stored in the keyword generation/accumulation managing unit 204, the second generator 103 can search for keywords that match with the search condition attributes and then perform a broad search by keyword using those keywords. Besides, if it is the case that the original common search condition that has been specified gets specified when the search condition attributes falling under the common search condition attributes included in the common search query are divided in a plurality of search queries; then the second generator 103 can generate a plurality of search queries from the common search query.

The execution control unit 104 determines the execution order of one or more search queries generated by the second generator 103. At that time, the execution control unit 104 can determine the execution order either according to the number of search conditions applied in the search queries or by referring to the usage frequencies of services that are obtained from the reproduction history information or the skipping history information stored in the contents-viewing/skipping-history accumulation managing unit 202. Alternatively, the execution control unit 104 can determine the execution order either according to the response time obtained from the execution history information stored in the search-query-execution-history accumulation managing unit 205 or according to the statistical information or the weight information that is appended to the keyword information stored in the keyword generation/accumulation managing unit 204. Besides, the execution control unit 104 can determine the actual execution order based on a more statically-established execution order policy in which, for example, the services that are associated with the database management system embedded in the receiving apparatus 100 are searched with top priority.

The obtaining unit 105 sends the search queries, for which the execution control unit 104 has determined the execution order, to the contents delivery servers 401 and 402, and instructs the contents delivery servers 401 and 402 to execute the search queries. Then, the obtaining unit 105 sends receives the metadata obtained as the result of search query execution from the contents delivery servers 401 and 402 and performs suitable analysis processing on the metadata to obtain common metadata. At that time, the obtaining unit 105 stores, in the search-query-execution-history accumulation managing unit 205, the above-mentioned execution result information that includes the entire information or the partial information specified in the search queries and that includes the number of received sets of metadata (retrieval count). Moreover, the obtaining unit 105 analyzes the received metadata by means of morphological analysis; extracts keywords; and stores, in the keyword generation/accumulation managing unit 204, keyword information that indicates the keywords and that includes the search conditions specified at the time of obtaining the metadata or includes service identifiers of the target services for searching that are necessary for referring to the service information.

Thus, the contents that have the attributes represented by the metadata that is retrieved in the above-mentioned manner are the contents matching with the search conditions. That is, when the metadata is retrieved by executing a search query in each service, it means that the contents matching with the search conditions are retrieved.

Explained below with reference to FIG. 17 is the sequence of a metadata obtaining operation performed in the receiving apparatus 100 according to the first embodiment. Herein, the explanation is based on the premise that the receiving apparatus 100 has already been switched ON and is in a state of being able to communicate with the contents delivery servers 401 and 402 over the network 301 via the communicating unit 106. Firstly, it is assumed that the contents/metadata displaying unit 101 of the receiving apparatus 100 is displaying some contents on the display unit and is reproducing the contents. There, for example, if the user operates the operation input unit and performs an operation input for searching the contents, then a contents search request message is sent to the receiving apparatus 100 as a response to the operation input (Step S101). At that time, the contents search request message can be configured to not include any particular search conditions but to only indicate that "request issued to search for contents related to contents being reproduced". Alternatively, if an operation input is performed to specify the search conditions such as keywords or genre codes, then the contents search request message can be configured to include those search conditions. Moreover, the screen illustrated in FIG. 8 can be displayed on the display unit of the receiving apparatus 100 and the user can be allowed to operate the operation input unit and perform an operation input to specify the search conditions on the screen being displayed.

Upon receiving the contents search request message, in the case when the contents search request message only indicates "request issued to search for contents related to contents being reproduced"; the contents/metadata displaying unit 101 of the receiving apparatus 100 obtains the metadata corresponding to the contents being reproduced from the metadata accumulation managing unit 201 (Step S102), and generates the common search query using the metadata corresponding to the contents being reproduced (Step S103). Meanwhile, in the case when the search conditions are explicitly specified in the contents search request message, the receiving apparatus 100 generates the common search query using those search conditions.

Subsequently, the contents/metadata displaying unit 101 outputs the common search query, which is generated at Step S103, to the selecting unit 102 (Step S104). Herein, it is assumed that the common search query is expressed as a Boolean expression, as given below in Expression 1, with two genres (G1, G2), two keywords (K1, K2), and two credits (C1, C2) as the search conditions. The Boolean expression of the common search query is referred to as a search formula. Moreover, the credits point to the information about concerned people such as characters, directors, or staff.

$$\text{search formula}:=(G1+G2)*(K1+K2)*(C1+C2) \qquad \text{Expression 1}$$

This search formula is generated by performing implicit OR concatenation of the contents having the same metadata attributes and performing AND concatenation of OR sets having different metadata attributes. However, the method of generating the search formula is not limited to the above-mentioned method. Alternatively, for example, all of the search condition attributes can be subjected to AND concatenation or all of the search condition attributes can be subjected to OR concatenation. Moreover, it is also an option to include variations of a plurality of search formulae. For example, in the case of subjecting all of the search conditions to AND concatenation, it is expected that strict search conditions are applied by which the contents having an extremely high degree of similarity with the contents being reproduced are considered to be search targets, and it is expected that the number of hits is small. In contrast, in the case of subjecting all of the search conditions to OR concatenation, it is sufficient if only a single search condition matches. Thus, the search conditions are loose thereby leading to the possibility of a greater number of hits of the contents. The method of generating the above-mentioned search formula is at an intermediate position of those two situations.

Subsequently, by receiving input of the common search query output at Step S104, the selecting unit 102 selects target services for searching. More particularly, for example, when the genre (G1) specified as the search condition is specified to be "news/reporting" by the genre code, the selecting unit 102 performs an operation to select the services that provide contents related to news. That happens when the selecting unit 102 obtains, from the service-information accumulation managing unit 203, the service information including genre code:G1 as the service attribute. Meanwhile, the selecting unit 102 can also select target services for searching by referring to the reproduction history information or the skipping history information stored in the contents-viewing/skipping-history accumulation managing unit 202. For example, from among the services having high usage frequencies, that is, from among the services providing contents for which the past reproduction is indicated by the reproduction history information or the skipping history information; the selecting unit 102 selects, as the target services for searching, services having the number of provided contents to be equal to or greater than a predetermined number.

Herein, the selecting unit 102 obtains, from the service-information accumulation managing unit 203, the service information including genre code:G1 as the service attribute (Step S105); selects, as a target service for searching, the contents delivery server 401 (hereinafter referred to as service S1) that is a service identified by the service information; refers to the reproduction history information or the skipping history information stored in the contents-viewing/skipping-history accumulation managing unit 202 and selects, as a target service for searching, the contents delivery server 402 (hereinafter referred to as service S2) (omitted from FIG. 17); and selects, as a target service for searching, the metadata accumulation managing unit 201 (hereinafter referred to as service S3) that serves as a local database service. At that time, the selection of the local database service can be considered to have been implicitly specified without fail or can be considered to have been automatically selected by the receiving apparatus 100 in view of the cache status of metadata. Subsequently, the selecting unit 102 adds the selected services as service conditions in the search formula given above in Expression 1 and updates the search formula as Expression 2 given below (Step S106). This search formula corresponds to the common search query.

$$\text{search formula}:=(S1+S2+S3)*(G1+G2)*(K1+K2)*(C1+C2) \qquad \text{Expression 2}$$

Subsequently, to the second generator 103, the selecting unit 102 outputs the service information of the services selected as the target services for searching as well as outputs the common search query (Step S107). The second generator 103 refers to the common search query, which is expressed as the search formula in Expression 2, and refers to the service information output at Step S107, and expands the common search query to search queries on a service-by-service basis. Herein, when the search query format specified in the service information is specified to be describable as a Boolean expression; the second generator 103 generates, from the common search query, the search queries expressed as Boolean expressions in the form of the search formula in Expression 2; and when the search query format is specified to be not describable as a Boolean expression; the second generator 103 performs product term expansion of the Boolean expression and uses each product term for generating a plurality of search queries from the common search query. For example, assume that the contents delivery server 401 allows the specification of search conditions using only a URL based on the REST style WebAPI and the contents delivery server 402 allows the specification of only such search conditions which are based on the SOAP style WebAPI but which do not allow Boolean expressions in the HTTP request body. In that case, regarding the services S1 and S2; the selecting unit 102 performs product term expansion of the search formula in Expression 2 and uses it to generate the search queries. In contrast, regarding the service S3; the selecting unit 102 attempts to generate the search queries by using the search formula in Expression 2 without modification as a constraint clause. Given below are the examples of the result of expansion on a service-by-service basis from the common search query.

Search Queries (S1) with Respect to the WebAPI-Based Contents Delivery Server 401:
(S1*G1*K1*C1)
(S1*G1*K1*C2)
(S1*G1*K2*C1)
(S1*G1*K2*C2)
. . . .
Search Queries (S2) with Respect to the WebAPI-Based Contents Delivery Server 402:
(S2*G1*K1*C1)
(S2*G1*K1*C2)
(S2*G1*K2*C1)
(S2*G1*K2*C2)
. . . .
Search Query (S3) with Respect to the SQL-Based Local Database Service (the Metadata Accumulation Managing Unit 201)
(S3)*(G1+G2)*(K1+K2)*(C1+C2)

Subsequently, the second generator 103 obtains, from the service-information accumulation managing unit 203, the service information corresponding to each of the services S1 and S2 that have been subjected to product term expansion (Step S108); and converts the common search conditions related to the services S1 and S2 into search queries on service-by-service basis. At that time, since the service S1 implicitly has genre code:G1 as a service attribute; in the above-mentioned first example, (K1*C1) is the search condition that is actually applied in the search queries. The second generator 103 makes use of those two search conditions and generates search queries to be sent to the contents delivery server 401 (Step S109). When the credit information (C1) is specifiable as a search condition for the contents delivery server 401 serving as the service S1, the second generator 103 generates, for example, from the above-mentioned expansion result, a search query as given below.
http://s1.example.com/search_api?keyword=keyword1&credit=character1

When the credit information (C1) is not specifiable as a search condition for the contents delivery server 401, the second generator 103 considers the credit information to be a keyword and generates, for example, from the above-mentioned expansion result, a search query as given below.
http://s1.example.com/search_api?keyword="keyword1 character1"

Besides, if the contents delivery server 401 does not supports the AND search, the second generator 103 generates, for example, from the above-mentioned expansion result, two divided search queries as given below.
http://s1.example.com/search_api?keyword="keyword1"
http://s1.example.com/search_api?keyword="character name 1"

In the first embodiment, the explanation is given with reference to genres, keywords, and credits as the search conditions. In the case of including the retrieval count of metadata that is the execution result of search queries, it is necessary to perform expansion by dividing the search queries in an identical manner as described above. More particularly, assume that the retrieval count of metadata that is the execution result of search queries is implicitly set to 50 sets. In that case, depending on the service, there are times when it is possible to obtain only a smaller number of sets of metadata than the 50 sets. At that time, for example, if the service S1 is providing an interface in which the upper limit of retrieval count is specified to be 25 sets, in which the offset of the metadata obtained as the result of executing the search queries is set using "from", and in which the number of sets is set using "count"; then the second generator 103 generates, for example, two divided search queries as given below.
http://s1.example.com/search_api?keyword="keyword1 character1"&from=1&count=25
http://s1.example.com/search_api?keyword="keyword1 character1"&from=26&count=25

As the methods of generating search queries with respect to the service S1, three methods are described above. However, those are not the only possible methods. As far as a method of expanding a search query that does not have search conditions equivalent to the common search conditions is concerned, that method also can be included in the service information. Meanwhile, regarding the service S2 that is selected according to the usage frequency, the genre is not implicitly applied as a search condition. In the above-mentioned first example of the result of expansion of the common search query related to the service S2, (G1*K1*C1) becomes the search condition that is actually applied in a search query. If the service S2 has genre as the search condition attribute, the second generator 103 expands the common search query in, for example, a SOAP message as given below.

```
<soap:Envelope
  xmlns:soap="http://schemas.xmlsoap.org/soap/envelope/">
    <soap:Header>
    <!-- abbreviation -->
    </soap:Header>
    <soap:Body>
        <m:getContentMetadata
  xmlns:m="http://s2.example.com/searchAPI/">
            <m:genre>G1</m:genre>
            <m:keyword>keyword1</m:keyword>
            <m:credit>character1</m:credit>
        </m:ContentMetadata>
    </soap:Body>
</soap:Envelope>
```

In the above-mentioned example, the explanation is based on the premise that the assigning system of genre codes is shared between the service S1 and the common search query. However, in the case when the service S2 has an independent system for genre codes, then the service information of the service S2 includes conversion table information that is used in converting the common genre codes such as genre code: G1, G2 into genre codes in the system of the service S2. The second generator 103 refers to the conversion table information, which is included in the service information stored in the service-information accumulation managing unit 203; converts the genre codes in the common system into the genre codes in the independent system of the service S2; and then generates search queries using the converted genre codes. For example, assume that, corresponding to G1 (news/reporting), the genre code of the service S2 is expressed with a character string "News". In that case, the search queries expanded by the second generator 103 are as follows (extract of only the Body element of SOAP).

```
<m:getContentMetadata
    xmlns:m="http://s2.example.com/searchAPI/">
        <m:genre>News</m:genre>
        <m:keyword>keyword1</m:keyword>
        <m:credit>character1</m:credit>
</m:ContentMetadata>
```

As still another variation, when the service S2 does not have the genres as the search condition attributes, the second generator 103 refers to the keyword information stored in the keyword generation/accumulation managing unit 204 and expands the genre codes in keyword groups. More particularly, the keyword generation/accumulation managing unit 204 stores therein keyword information that represents keywords extracted by the obtaining unit 105 from the metadata by means of morphological analysis, and that includes search conditions specified at the time of obtaining the metadata or includes service identifiers of the target services for searching that are necessary for referring to the service information. With that, it becomes possible to obtain the keyword information that has genres as search condition attributes as well as to obtain the appearance frequencies in a particular period of time. More particularly, it becomes possible to extract, from the genre "news/reporting", the keywords having high appearance frequencies of late (for example, names of politicians under the spotlight of late, names of cases that have occurred of late, or names of the accused people). When the service S2 cannot specify genres as search conditions, the second generator 103 treats the genre codes as keys; refers to the keyword information stored in the keyword generation/accumulation managing unit 204 and the service information stored in the service-information accumulation managing unit 203; and generates a substitute keyword list that is a list of keywords that can be substituted for genres. For example, herein, assume that "news keyword A", "news keyword B", and "news keyword C" are obtained as keywords that can be substituted for genres. Then, the second generator 103 uses those keywords and generates a SOAP message as given below (extract of only the Body element of SOAP).

```
<m:getContentMetadata
xmlns:m="http://s2.example.com/searchAPI/">
        <m:keyword>news keyword A OR news keyword B OR news keyword C</m:keyword>
        <m:credit>character name</m:credit>
</m:getContentMetadata>
```

In this example, the OR search in the service S2 is implemented by explicitly specifying the character string "OR" in between the keywords. Such search rules are specified in a portion of the service information as the format of search queries.

Moreover, in the first embodiment, the explanation is given for a specific example in which the service S1 is a commonly-used REST style WebAPI, the service S2 is a commonly-used SOAP style WebAPI, and the search query information is specified in a URL. However, for example, there are available services which, as WebAPIs, provide a search interface in SQL format. In the first embodiment, such services can also be supported in an identical manner to the generation of search queries with respect to the local database services.

Regarding the search queries corresponding to the service S3 that serves as the local database service, the second generator 103 refers to the expansion result ((S3)*(G1+G2)*(K1+K2)*(C1+C2)) of the above-mentioned search query and refers to the selected service information; replaces "S3" with "S1+S2"; and generates an SQL statement from ((S1+S2)*(G1+G2)*(K1+K2)*(C1+C2)) obtained as the result. Most simply, an SQL statement is generated as given below.
select * from content_metadata_table
where (service='S1' or service='S2') and
  (genre='G1' or genre='G2') and
  (keyword='K1' or keyword='K2') and
(credit='C1' or credit='C2')

The above-mentioned SQL statement includes a constraint clause in which keywords and credits are exactly matching. Alternatively, it is also possible to change that constraint clause to partial matching or to add the title or the synopsis column to the scope of a search by keyword. This is an expansion method that is required in response to a condition when the keywords provided by a contents delivery server are insufficient if the metadata has not been subjected to processing such as morphological analysis. In this case, for example, the SQL statement is written as given below.
select * from content_metadata_table
where (service='S1' or service='S2') and
  (genre='G1' or genre='G2') and
  (keyword='K1' or keyword='K2' or title like '%K1%' or title like '%K2%'
or synopsis like '%K1%' or synopsis like '%K2%') and
(credit='C1' or credit='C2')

As described above, when the common search query includes a plurality of variations such as a search formula having all of the search conditions subjected to AND concatenation, the second generator 103 expands each variation in an identical manner in the search queries on a service-by-service basis.

Subsequently, the second generator 103 outputs the list of generated search queries to the execution control unit 104 (Step S110). Then, the execution control unit 104 determines the execution order of a plurality of search queries output at Step S110 (Step S111). In order to determine the execution order, for example, a method can be implemented in which the search queries having a greater number of search conditions applied thereto are priority for searching at a higher execution order. Assume that all of the search conditions are subjected to AND concatenation. Then, while searching for "contents related to contents being reproduced"; although the search results are few, the metadata having the highest degree of similarity is obtained. Alternatively, a method can be implemented in which the reproduction history information or the skipping history information stored in the contents-viewing/skipping-history accumulation managing unit 202 is referred to, and the services having higher usage frequencies are given priority for searching at a higher execution order. Still alternatively, a method can be implemented in which the average response time or the average number of obtainable sets of metadata is obtained from the execution result information stored in the search-query-execution-history accumulation managing unit 205; the priority is set based on that information; and the execution order is determined in such a way that, higher the priority, higher the execution order. In the first embodiment, the execution control unit 104 determines the execution order based on the number of search conditions that are applied. Then, in accordance with the execution order that has been determined, the execution control unit 104 sequentially outputs the search queries to the obtaining unit 105 (Step S112). Alternatively, the execution control unit 104 can also output at once a list of the search queries along with execution order information indicating the execution order that has been determined.

The obtaining unit 105 sequentially executes the search queries that have been output at Step S112. More particularly, the obtaining unit 105 sends the search queries to the local database (the metadata accumulation managing unit 201) corresponding to the service S3, to the contents delivery server 401 corresponding to the service S1, and to the contents delivery server 402 corresponding to the service S2. The search with respect to the service S3 is carried out by establishing a connection with the database management system in the metadata accumulation managing unit 201 and by issuing the SQL statement generated as search queries (Step S113). The search with respect to the service S1 is carried out by sending a HTTP request having a search query in the URL to the contents delivery server 401 via the communicating unit 106 and the network 301 (Step S115). The searching of the service S2 is carried out by sending a HTTP request having a search query in the URL to the contents delivery server 402 via the communicating unit 106 and the network 301 (Step S116).

Upon executing the SQL statement and obtaining the metadata, the metadata accumulation managing unit 201 sends the metadata back to the obtaining unit 105 (Step S114). The contents delivery server 401 receives the search query via the network 301 and executes that search query so as to obtain the corresponding metadata, and then sends that metadata to the receiving apparatus 100 (Step S117). In an identical manner, the contents delivery server 402 receives the search query via the network 301 and executes that search query so as to obtain the corresponding metadata, and then sends that metadata to the receiving apparatus 100 (Step S118).

Upon receiving the metadata from each of the services S1, S2, and S3; the obtaining unit 105 performs analysis processing on the metadata as necessary. In the case when the metadata accumulation managing unit 201 serving as the service S3 is configured to send the metadata back to the obtaining unit 105 in a common metadata format, the analysis processing need not be performed on the metadata obtained from the service S3. However, regarding the services S1 and S2, since independent XML-based metadata formats are used, it is necessary to perform the analysis processing on the metadata obtained from those services. Regarding each of the services S1 and S2, the obtaining unit 105 obtains the service information stored in the service-information accumulation managing unit 203 (Step S119); performs analysis processing on the metadata based on the metadata format specified in the service information; and converts that metadata into metadata in the common metadata format so as to generate the common metadata (Step S120). Moreover, along with analyzing the received metadata, the obtaining unit 105 analyzes particular attributes (title or program explanation) of the metadata by means of morphological analysis; extracts the keywords; and stores, in the keyword generation/accumulation managing unit 204, the keyword information that indicates the keywords and that includes the search conditions specified at the time of obtaining the metadata or includes service identifiers of the target services for searching that are necessary for referring to the service information. Then, the obtaining unit 105 outputs the common metadata that has been generated to the contents/metadata displaying unit 101 (Step S121).

The contents/metadata displaying unit 101 follows, for example, the output order of the metadata that has been output at Step S121 and displays only the displayable number of sets on the display unit (Step S122). At that time, the contents/metadata displaying unit 101 refers to the display attribute information stored in the contents/metadata-displaying-unit-attribute-information accumulation managing unit 206 and displays the metadata on the display unit. Meanwhile, when the display format of the metadata is a ticker-like format (for example, a list of the search results is displayed from right to left in an automatically scrolling manner); there is no need to restrict the number of sets, and the contents/metadata displaying unit 101 can sequentially display the metadata that has been output by the obtaining unit 105. As a result, the metadata related to the contents being reproduced or the metadata retrieved in response to explicit search instructions gets displayed on the screen of the display unit.

In this way, according to the first embodiment, in an environment in which there are an enormous number of target services for searching; on the side of the receiving apparatus that receives contents, it becomes possible to solve various problems that may occur while executing the search for contents in response to instructions from the user. Firstly, in the case when the receiving apparatus performs inter-service searches across a plurality of services in real-time; since the target services for searching are large in number, the number of search queries that need to be issued or the total number of sets of metadata that need to be received and processed happen to be enormous. That makes it virtually difficult to carry out inter-service searches. Meanwhile, in the case when inter-service searches are carried out not on the side of the receiving apparatus but on the side of the contents delivery servers, it is common practice to cyclically obtain the Web page provided by each service, temporarily store the Web pages in a database, and then use the metadata in an integrated manner in SQL (Structured Query Language). However, it is difficult to apply such a configuration to the side of the receiving apparatus. That is because it is not realistic to secure a memory region in the receiving apparatus for storing the metadata obtained cyclically from all of a plurality of services. In contrast, in the first embodiment, the selecting unit 102 narrows down the target services for searching to an appropriate search scope within which the search can be carried out. That enables achieving a solution to the first problem. That is, when the future diversification and ubiquitousness of services that deliver contents is taken into account, narrowing down of services in a receiving apparatus as described in the first embodiment makes it possible to perform inter-service searches across a plurality of services within the scope of the processing capacity of the receiving apparatus.

Secondly, with respect to a plurality of services having different search criteria such as different formats of search queries or different acceptable search conditions; it is not an easy task to accurately project the original search formula representing the search conditions for searching the intended contents, and it is difficult to maintain the intent of the search according to the original search formula. In that regard, the second generator 103 refers to the common search query and expands such search queries on a service-by-service basis that are as close as possible to the original search formula. That enables achieving a solution to the second problem. That is, conventionally, at the time of conversion into search queries within the search criteria acceptable by each service, there is risk of degeneration in the intent of the search according to the original search formula, thereby making it difficult to find the intended contents. Herein, the odds that such a situation occurs can be lowered.

Thirdly, in the case of issuing search queries from the receiving apparatus with respect to a plurality of services; as compared to the case when metadata is received from a single service and is then displayed, it takes an extremely long time to post the contents. In that regard, by controlling the execution order of the search queries that are expanded from the search formula on a service-by-service basis, it becomes possible to post the contents intended by the user in a more efficient manner. That enables achieving a solution to the third problem.

Second Embodiment

Given below is the explanation of the receiving apparatus according to a second embodiment. The constituent elements that are in common with the above-mentioned first embodiment are referred to by the same reference numerals and the explanation thereof is not repeated.

(1) Configuration

Figure 18:
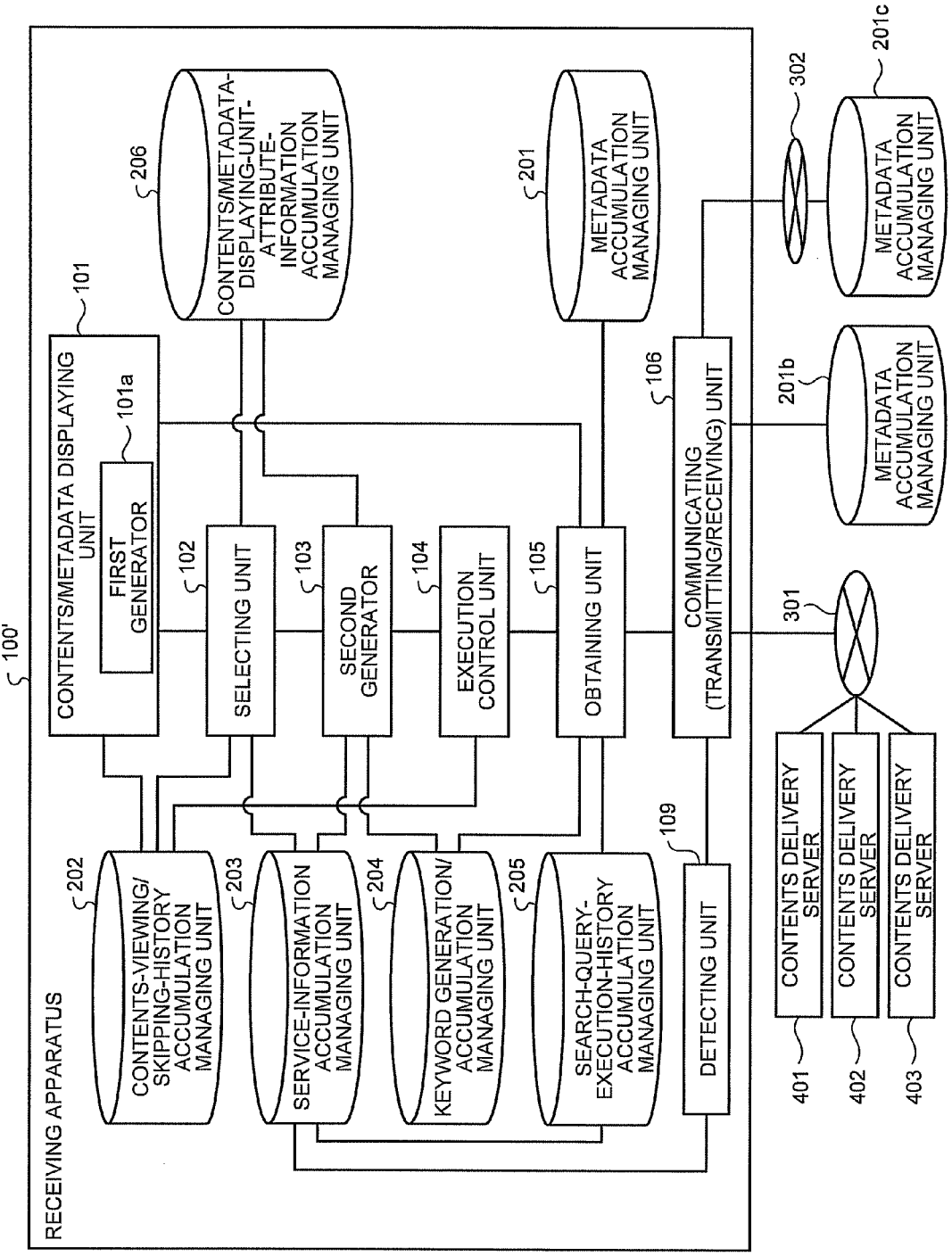
FIG. 18 is a diagram illustrating a configuration of a receiving apparatus according to a second embodiment.

FIG. 18 is a diagram illustrating a configuration of the receiving apparatus 100' according to the second embodiment. Herein, in addition to the contents/metadata displaying unit 101, the selecting unit 102, the second generator 103, the execution control unit 104, the obtaining unit 105, the communicating unit 106, the metadata accumulation managing unit 201, the contents-viewing/skipping-history accumulation managing unit 202, the service-information accumulation managing unit 203, the keyword generation/accumulation managing unit 204, the search-query-execution-history accumulation managing unit 205, and the contents/metadata-displaying-unit-attribute-information accumulation managing unit 206; the receiving apparatus 100' according to the second embodiment also includes a detecting unit 109. Besides, to the communicating unit 106 of the receiving apparatus 100', a metadata accumulation managing unit 201b is connected; a metadata accumulation managing unit 201c is connected via a network 302; and a contents delivery server 403 is connected in addition to the contents delivery servers 401 and 402 via the network 301. The metadata accumulation managing unit 201b is built in an external memory device that is connected to the receiving apparatus 100' by a communication cable. For example, the external memory device is an external hard disk drive connected via a USB cable. The metadata accumulation managing unit 201c is built in another device that is available on the network 302. For example, that other device is a NAS (Network Access Storage) device. The network 302 is, for example, a LAN (Local Area Network) that constitutes a home network. However, as long as the metadata accumulation managing units 201b and 201c are accessible as database management systems from the receiving apparatus 100', any type of configuration can be implemented. In an identical manner to the metadata accumulation managing unit 201, each of the metadata accumulation managing units 201b and 201c performs metadata management and functions as a local database service, which is one of the services.

The detecting unit 109 stores usage availability flags, which indicate usage availability of services, in a corresponding manner with service information in the service-information accumulation managing unit 203. As far as usage availability of services is concerned, for example, the detecting unit 109 detects the usage availability by establishing a connection with the services on a periodic basis or by receiving, from the services, asynchronous notification of usage availability information including the usage availability. In the second embodiment, the explanation is not given for a sequence of detecting a condition when a service is "unavailable" for use. However, such detection can be carried out by following an operation sequence that is equivalent to an operation sequence given below regarding the operations starting from detecting connections of services up to reflecting information in the service-information accumulation managing unit 203. However, as far as determining whether or not a service is "unavailable" for use is concerned, a method is implemented in which the communication timeout or the number of trials at the time of failure serves as the determination criterion and some kind of a threshold value is set for that determination criterion.

The service-information accumulation managing unit 203 stores therein the above-mentioned service information in a corresponding manner to the usage availability flags, and manages the stored information. Herein, the service information stored in the metadata accumulation managing unit 201 has a parent-child relationship with the service information stored in each of the metadata accumulation managing units 201b and 201c. That is, the service identifier of the metadata accumulation managing unit 201 is set in a parent service identifier specified in the service information stored in each of the metadata accumulation managing units 201b and 201c.

Figure 19:
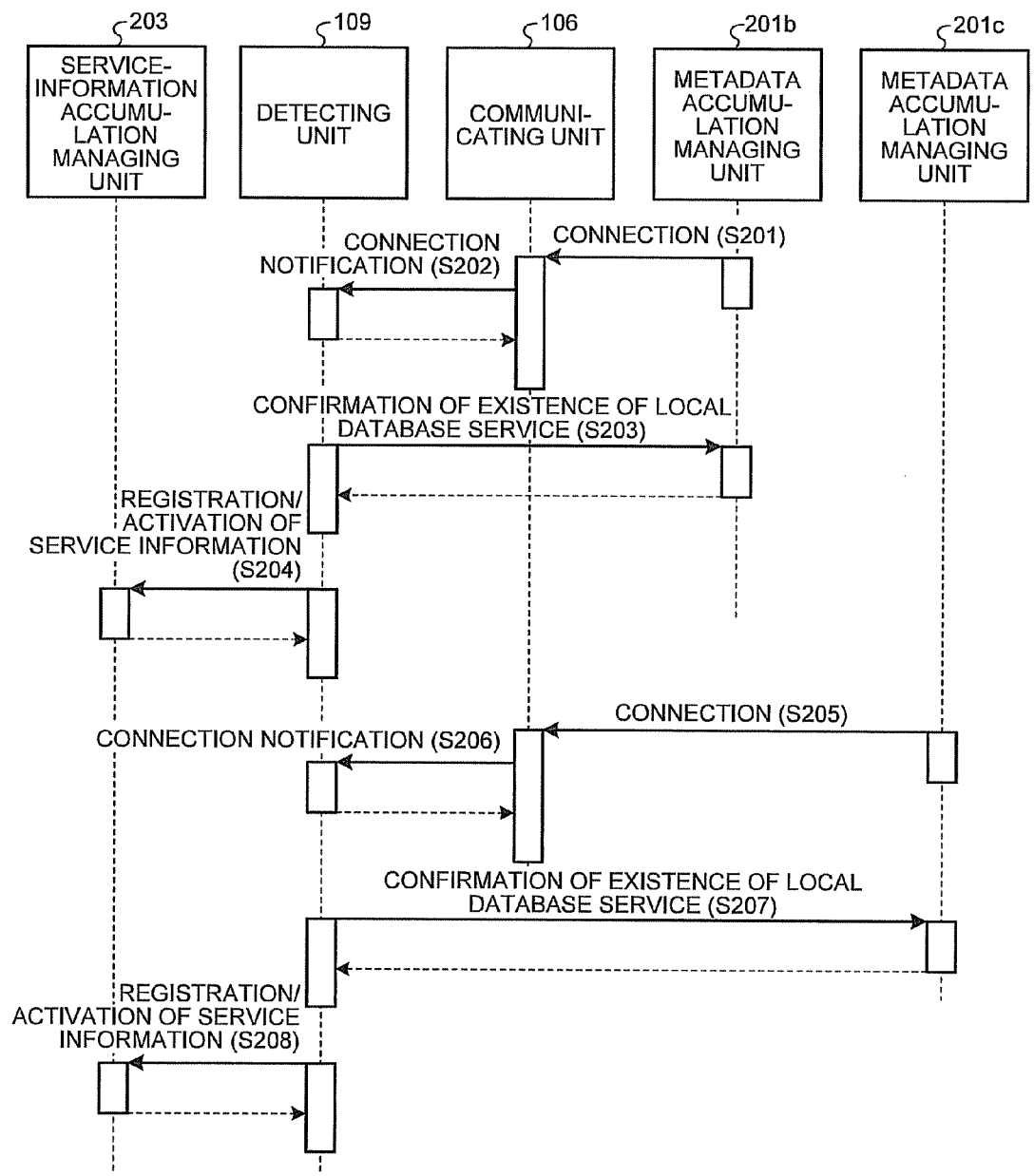
FIG. 19 is a flowchart for explaining a sequence of a service detecting operation, performed during a metadata obtaining operation, for detecting available services.

Explained below is the sequence of a metadata obtaining operation performed in the receiving apparatus 100' according to the second embodiment. FIG. 19 is a flowchart for explaining a sequence of a service detecting operation, performed during the metadata obtaining operation, for detecting available services. Herein, the explanation is based on the premise that the receiving apparatus 100' has already been switched ON and is in a state of being able to communicate with the contents delivery servers 401 to 403 over the network 301 via the communicating unit 106. As the initial state according to the second embodiment, it is assumed on the one hand that the contents delivery servers 401 to 403 are accessible from the receiving apparatus 100'; and it is assumed on the other hand that the metadata accumulation managing unit 201b, which is built in an external memory device connected to the receiving apparatus 100' by a USB cable, and the metadata accumulation managing unit 201c, which is built in an NAS device, are not yet connected to the receiving apparatus 100'.

Firstly, once the external memory device having the metadata accumulation managing unit 201b built therein is connected to the receiving apparatus 100' (Step S201), the communicating unit 106 detects a USB cable connection and notifies the detecting unit 109 that a new external device has been connected (Step S202). Then, the detecting unit 109 confirms whether or not the newly-connected external memory device has the metadata accumulation managing unit 201b built therein (Step S203). Herein, whether or not the metadata accumulation managing unit 201b, which serves as a database management system, is built can be confirmed on the premise that the metadata accumulation managing unit 201b is built over a particular path in the external memory device. Alternatively, without setting any particular path, such a confirmation can be performed by storing in advance, in the service-information accumulation managing unit 203, a device identifier used in identifying the newly-built metadata accumulation managing unit 201b and a database pass generated at the time of building the metadata accumulation managing unit 201b; and then by referring to that information. In the second embodiment, upon detecting that the metadata accumulation managing unit 201b has been built, the detecting unit 109 updates the usage availability flag, which is stored in the service-information accumulation managing unit 203 in a corresponding manner to the service information of the metadata accumulation managing unit 201, in such a way that the usage availability flag indicates that the service is in a usable state (Step S204). As a result, in the receiving apparatus 100', the metadata accumulation managing unit 201b is activated as a usable service. In an identical sequence, the detecting unit 109 detects that the NAS device is connected to the network 302 and that the metadata accumulation managing unit 201c is in a usable state (Steps S205 to S208). Meanwhile, as described above, the service information of each of the metadata accumulation managing units 201b and 201c that is stored in the service-information accumulation managing unit 203 includes the service identifier of the metadata accumulation managing unit 201 as a parent service identifier.

Subsequently, in an identical manner to Steps S101 to S103 explained with reference to FIG. 17 in the above-mentioned first embodiment; the user operates the operation input unit and performs an operation input for searching the contents, and the contents/metadata displaying unit 101 of the receiving apparatus 100' receives a contents search request message and generates the common search query. Herein, in an identical manner to the first embodiment, it is assumed that the generated common search query is expressed as a Boolean expression, as given in Expression 1, with two genres (G1, G2), two keywords (K1, K2), and two credits (C1, C2) as the search conditions.

Then, in an identical manner to Step S104 illustrated in FIG. 17, the selecting unit 102 receives input of the common search query and selects target services for searching. Herein, it is assumed that the selecting unit 102 selects only the local database service (assumed to be the metadata accumulation managing unit 201 or, identical to the first embodiment, assumed to be the service S3). Subsequently, from the metadata accumulation managing unit 201, the selecting unit 102 obtains the service information of the metadata accumulation managing unit 201 and also obtains the sets of service information in each of which the service information of the metadata accumulation managing unit 201 is set as the parent service information. Thus, herein, the selecting unit 102 obtains the service information of each of the metadata accumulation managing units 201b and 201c, which serve as the dependent services with the metadata accumulation managing unit 201 as the parent service. Then, in an identical manner to Step S106 illustrated in FIG. 17, the selecting unit 102 adds the selected service as a service condition in the search formula in Expression 1 and updates the search formula as Expression 3 given below. This search formula corresponds to the common search query.

$$\text{search formula}:=(S3)*(G1+G2)*(K1+K2)*(C1+C2) \quad \text{Expression 3}$$

Moreover, the selecting unit 102 adds the service information of the dependent services in the common search query and outputs, to the second generator 103, the common search query appended with that service information.

Figure 20:
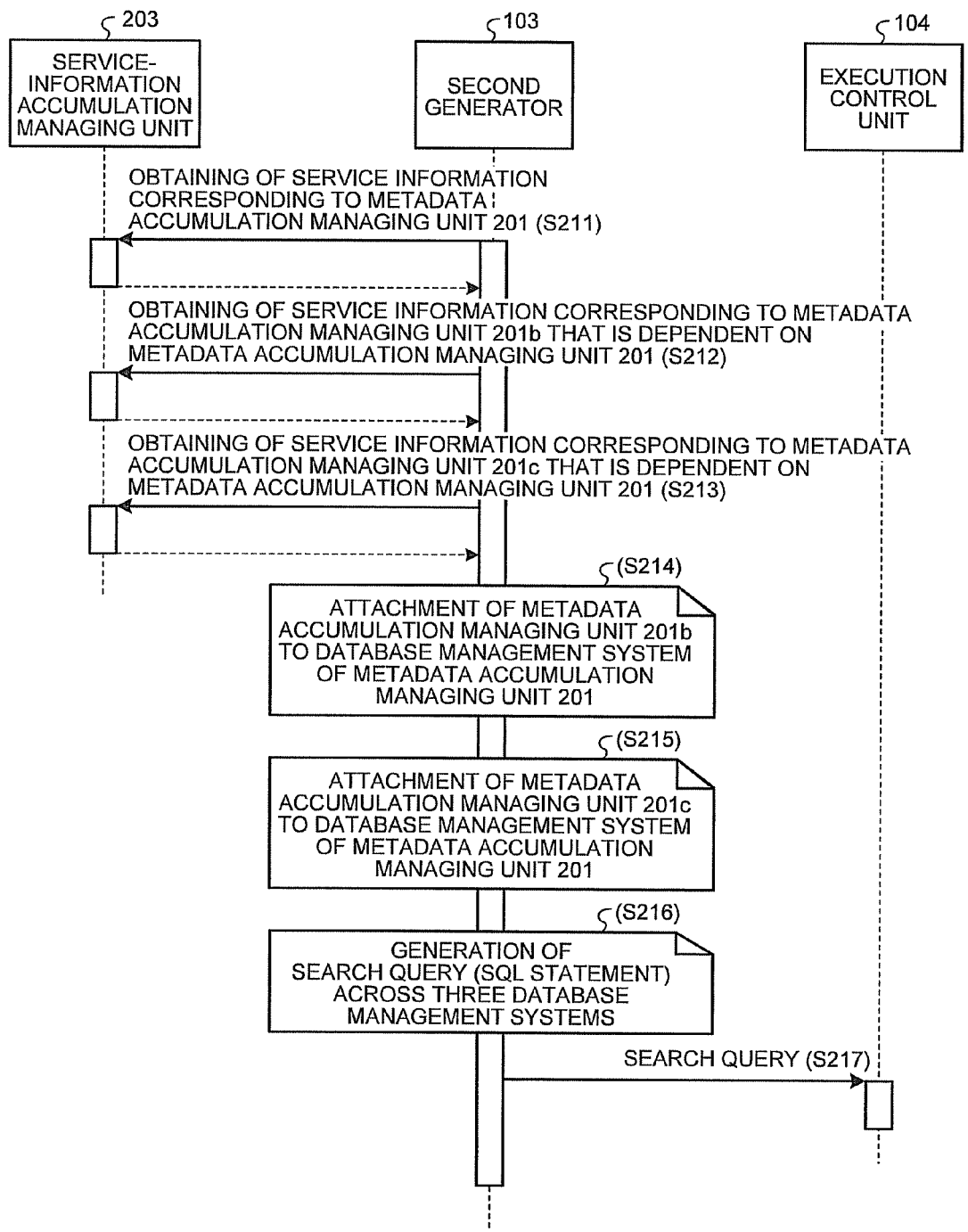
FIG. 20 is a flowchart illustrating the sequence of a search query generating operation, performed during the metadata obtaining operation, for generating search queries after the service detecting operation is performed.

FIG. 20 is a diagram illustrating the sequence of a search query generating operation, performed during the metadata obtaining operation, for generating search queries after the service detecting operation is performed. At the time of generating search queries corresponding to the service S3 specified in the common search query, the second generator 103 obtains the service information of the metadata accumulation managing unit 201 serving as the parent service (Step S211) and obtains the service information of each of the dependent services (herein, the metadata accumulation managing units 201b and 201c) that is added to the common search query (Steps S212 and S213). More particularly, firstly, the second generator 103 attaches the database management system of each of the metadata accumulation managing units 201b and 201c to the database management system of the metadata accumulation managing unit 201, and maintains the database management systems in an integratedly accessible manner (Steps S214 and S215). Then, for example, the second generator 103 generates, as given below, an SQL statement for integrated search in which the respective database management systems are concatenated with UNION (Step S216). In this example, as the service information of the dependent services, the metadata accumulation managing units 201b and 201c respectively have database names "SUB_B" and "SUB_C", and are attached using that information.

select * from content_metadata_table
where (service='S1' or service='S2') and
   (genre='G1' or genre='G2') and
   (keyword='K1' or keyword='K2') and
(credit='C1' or credit='C2')
union
select * from 'SUB_B'.content_metadata_table
where (service='S1' or service='S2') and
   (genre='G1' or genre='G2') and
   (keyword='K1' or keyword='K2') and
(credit='C1' or credit='C2')
union
select * from 'SUB_C'.content_metadata_table
where (service='S1' or service='S2') and
   (genre='G1' or genre='G2') and
   (keyword='K1' or keyword='K2') and
(credit='C1' or credit='C2')

Meanwhile, instead of the second generator 103 performing Step S213 as described above; it is also possible that, at the time when the detecting unit 109 detects that the NAS device has been connected to the network 302 and detects that the metadata accumulation managing unit 201c is in a usable state, Step S203 can be performed simultaneously with the updating of the usage availability flag that is stored in the service-information accumulation managing unit 203 in a corresponding manner to the service information of the metadata accumulation managing unit 201c.

As described above, the second generator 103 generates the SQL statement as a search query. Then, the second generator 103 outputs the generated SQL statement to the execution control unit 104 (Step S217). If more than one SQL statement is generated, then the execution control unit 104 determines the execution order of a plurality of SQL statements in an identical manner to Steps S111 and S112 illustrated in FIG. 17, and sequentially outputs the SQL statements according to the execution order to the obtaining unit 105. Herein, it is assumed that only a single SQL statement is generated and output to the obtaining unit 105. Then, the obtaining unit 105 executes the SQL statement output by the second generator 103 and appropriately receives metadata from the metadata accumulation managing units 201, 201b, and 201c; and, in an identical manner to Step S120 illustrated in FIG. 17, performs analysis processing on the metadata as necessary and generates the common metadata. Subsequently, in an identical manner to Step S121 illustrated in FIG. 17, the obtaining unit 105 outputs the common metadata that has been generated to the contents/metadata displaying unit 101. Then, in an identical manner to Step S122 illustrated in FIG. 17, the contents/metadata displaying unit 101 follows, for example, the output order of the metadata and displays it on the display unit.

In this way, even in the case when a plurality of target services for searching have a hierarchical relationship therebetween; the detecting unit 109 performs the addition and activation of target services for searching in a dynamic manner, and the second generator 103 generates search queries according to the hierarchical relationship between the services. As a result, inter-service searches across a plurality of services can be performed only with respect to the usable services.

Third Embodiment

Given below is the explanation of the receiving apparatus according to a third embodiment. The constituent elements that are in common with the above-mentioned first embodiment or the second embodiment are referred to by the same reference numerals and the explanation thereof is not repeated.

Figure 21:
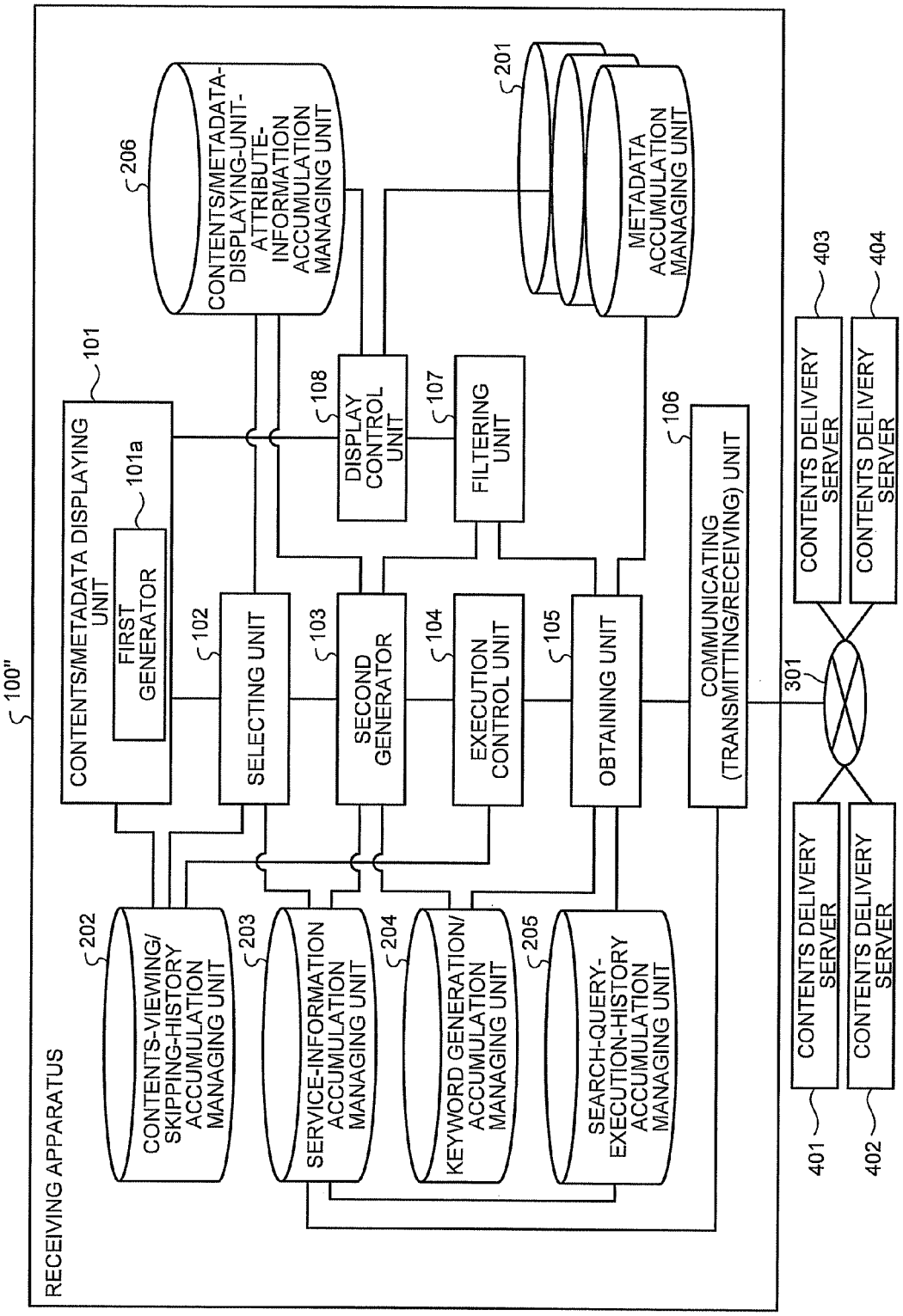
FIG. 21 is a diagram illustrating a configuration of a receiving apparatus according to a third embodiment.

FIG. 21 is a diagram illustrating a configuration of a receiving apparatus 100" according to the third embodiment. Herein, in addition to the contents/metadata displaying unit 101, the selecting unit 102, the second generator 103, the execution control unit 104, the obtaining unit 105, the communicating unit 106, the metadata accumulation managing unit 201, the contents-viewing/skipping-history accumulation managing unit 202, the service-information accumulation managing unit 203, the keyword generation/accumulation managing unit 204, the search-query-execution-history accumulation managing unit 205, and the contents/metadata-displaying-unit-attribute-information accumulation managing unit 206; the receiving apparatus 100" according to the third embodiment also includes a filtering unit 107 and a display control unit 108. Moreover, in addition to the contents delivery servers 401 and 402, the contents delivery server 403 and a contents delivery server 404 are also connected to the communicating unit 106 of the receiving apparatus 100" via the network 301.

In an identical manner to the above-mentioned first embodiment, the second generator 103 generates search queries with respect to the target services for searching and outputs the search queries to the execution control unit 104. In addition, in the third embodiment, the second generator 103 outputs, to the obtaining unit 105, an unapplied search condition list that includes the search conditions which could not be applied in the search queries generated with respect to the target services for searching. If a particular service does not have search condition attributes matching with the common search conditions but has metadata attributes matching with the common search conditions; then the common search conditions correspond to the search conditions that could not be applied in the search queries. Thus, the unapplied search condition list includes such search conditions.

In an identical manner to the above-mentioned first embodiment, the obtaining unit 105 sequentially executes the search queries that have been output from the execution control unit 104; obtains metadata; performs appropriate analysis processing on the metadata; and obtains the common metadata. Moreover, the obtaining unit 105 outputs the unapplied search condition list, which has been received from the second generator 103, to the filtering unit 107.

With respect to the common metadata output by the obtaining unit 105, the filtering unit 107 performs filtering by applying those search conditions which are listed in the unapplied search condition list and which could not be applied in the search queries. That is, with respect to the common metadata output by the obtaining unit 105, the filtering unit 107 performs filtering by searching for the metadata that matches with the search conditions which could not be applied in the search queries, and by deleting the metadata that does not match with those search conditions. That results in narrowing down of the corresponding contents.

As a specific example, in a particular service, if it is not possible to specify the age limit information as a search query but if the received metadata includes the age limit information and if the common search conditions include the age limit information; then, with respect to that particular service, the obtaining unit 105 executes search queries by excluding the age limit information, and outputs, to the filtering unit 107, the common metadata that is obtained by means of appropriate analysis processing and an unapplied search condition list that includes the age limit information as the search condition which could not be applied. Then, the filtering unit 107 refers to the age limit information reflected in the unapplied search condition list and refers to the age limit information included as an attribute in the common metadata, and searches for the corresponding common metadata. Thus, the common metadata obtained as the result of searching is the result of filtering. In this way, the filtering unit 107 performs filtering of the metadata output by the obtaining unit 105. Then, the filtering unit 107 outputs the common metadata that is obtained as the result of filtering to the display control unit 108.

The display control unit 108 merges the sets of common metadata that are output from the filtering unit 107 and that are received from a plurality of services, and selects the metadata to be displayed on the contents/metadata displaying unit 101 by referring to only those search conditions, from among the common search conditions specified in the common search query, which are applicable to the sets of common metadata that have been merged. For example, when the common search conditions include a sorting condition; the display control unit 108 follows that sorting condition, performs a sorting operation to sort the merged metadata, and displays the sorted metadata on the display unit. Herein, for example, the display control unit 108 performs batch sorting of a certain number of sets of metadata at a time. At that time, a certain number of sets of metadata that is to be sorted are cached in the metadata accumulation managing unit 201. For example, the display control unit 108 has an on-memory database (not illustrated) with the same table configuration as that of the metadata accumulation managing unit 201, and sequentially stores the metadata output by the filtering unit 107 in the on-memory database.

Figure 22:
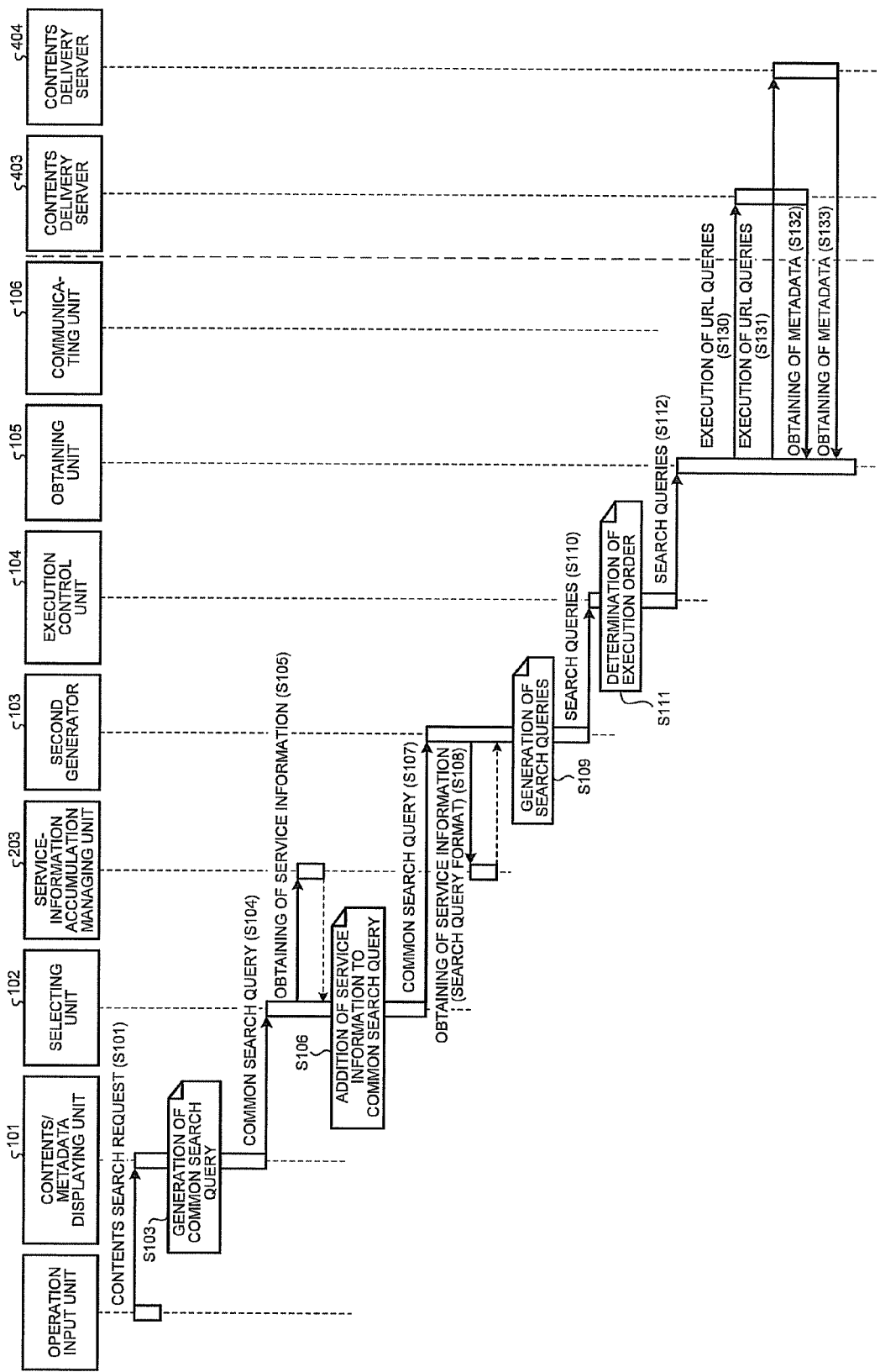
FIG. 22 is a flowchart for explaining the sequence of a metadata obtaining operation performed in the receiving apparatus.
Figure 23:
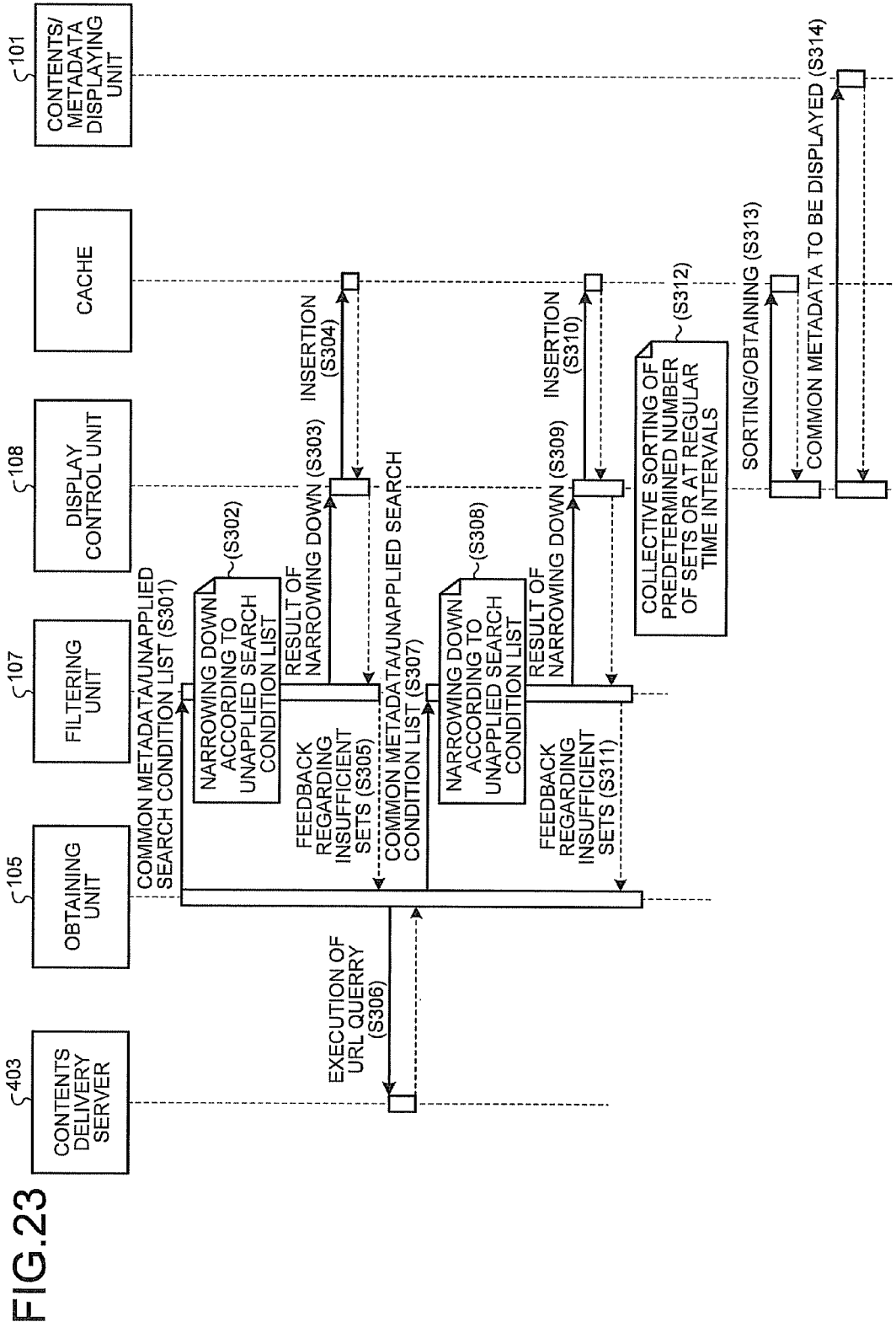
FIG. 23 is a flowchart for explaining the sequence of the metadata obtaining operation performed in the receiving apparatus.

Explained below with reference to FIGS. 22 and 23 is the sequence of a metadata obtaining operation performed in the receiving apparatus 100" according to the third embodiment. Herein, the operations at Step S101, Step S103, and Step S104 are substantially identical to the operations described in the first embodiment. Meanwhile, at Step S104, it is assumed that the common search query is expressed as a Boolean expression, as given below in Expression 4, with a single genre (G1), a single title (T1), a single duration (D1), and a sorting condition (O1) according to a single release date (release/broadcast starting date and time or release/broadcast ending date and time) as the search conditions.

search formula:=$(G1)*(T1)*(D1)*(O1)$  Expression 4

More particularly, it is assumed that G1 represents the genre code for "movie" and T1 represents a keyword (such as "ABC") that is included in the title of the movie. Moreover, it is assumed that D1 specifies an upper limit for the duration such as "within 60 minutes". Alternatively, D1 can also be specifying a range of the duration such as "from 60 minutes to 120 minutes" or can be specifying a lower limit for the duration such as "equal to or greater than 30 minutes". Thus, the common search conditions can include the search conditions based on such inequalities. Meanwhile, O1 generally represents "new releases"; and, herein too, "new releases" is specified as the sorting condition.

Subsequently, by receiving input of the common search query output at Step S104, the selecting unit 102 selects target services for searching by performing the operations at Steps S105 and Step S106 in an identical manner to the first embodiment. More particular, in the third embodiment, since the genre code represents "movie", either those services can be selected which store therein only the contents and the metadata of movies in a searchable manner or those services can be selected which store therein the contents and the metadata of a large number of movies. Such a selection criterion can be implemented when the service-information accumulation managing unit 203 manages, as service information, the search condition attribute such as the intended genre of the services. Since this point has already been explained in the first embodiment, the repetition thereof is avoided. Herein, it is assumed that, as a result, the contents delivery server 403 (referred to as service S4) and the contents delivery server 404 (service S5) are selected as target services for searching. With that, the search formula in Expression 4 is updated to a search formula in Expression 5 given below. Thus, at Step S107, the selecting unit 102 treats the search formula in Expression 5 as the common search query and outputs, to the second generator 103, that search formula as well as the service information of the services selected as the target services for searching.

$$(S4+S5)*(G1)*(T1)*(D1)*(O1) \qquad \text{Expression 5}$$

The second generator 103 refers to the common search query, which is expressed as the search formula in Expression 5, as well as refers to the service information output at Step S107, and expands the common search query to search queries on a service-by-service basis. Herein, it is assumed that each of the contents delivery servers 403 and 404 allows the specification of search conditions using only URLs based on REST style WebAPIs and is not compatible to the description of search conditions in a structural manner (allowing logical expression) such as in SQL. In this case, the second generator 103 performs product term expansion of the search formula in Expression 5 and obtains Expressions 6 and 7 as given below.

$$(S4)*(G1)*(T1)*(D1)*(O1) \qquad \text{Expression (6)}$$

$$(S5)*(G1)*(T1)*(D1)*(O1) \qquad \text{Expression (7)}$$

Then, from those search formulae, the second generator 103 respectively obtains the service information of the contents delivery server 403 serving as the service S4 and the service information of the contents delivery servers 404 serving as the service S5 from the service-information accumulation managing unit 203 (Step S108), and generates the actual search queries (URL) (Step S109). Meanwhile, it is assumed that, in the contents delivery server 403, the title and the genre can be specified as search conditions but sorting conditions according to durations and release dates cannot be specified as search conditions. The second generator 103 refers to the service information stored in the service-information accumulation managing unit 203 and determines about the search condition attributes that are supported. At the same time, from that service information, the second generator 103 refers to the supported metadata attributes and confirms that the metadata that is obtained as a result of executing the search queries includes information regarding the duration and the release date. Herein, the second generator 103 makes use of genre:G1 and title:T1 as specifiable search conditions and generates a search query as given below. At that time, the genre="movie" corresponding to G1 is converted into "Movie" in conformity with the display format of genres of the contents delivery server 403.
http://s4.example.com/
search_api?genre=Movie&title=ABC&from=1&count=50

In contrast, it is assumed that, in the contents delivery server 404, a sorting condition according to genres can be specified but sorting conditions according to titles, durations, and release dates cannot be specified as search conditions. The second generator 103 confirms, from the service information stored in the service-information accumulation managing unit 203, that the keyword is specifiable as a search condition and that the metadata obtained as a result of executing search queries includes information regarding the duration, the title, and the release date. Herein, the second generator 103 substitutes a title with a keyword as a search condition and generates a search query as given below using G1 and T1.
http://s4.example.com/
search_api?genre=MOVIE&keyword=
ABC&from=1&count=50

Subsequently, the second generator 103 outputs, to the execution control unit 104, a list of search queries that have been generated at Step S109 (Step S110). In addition, the second generator 103 outputs, to the obtaining unit 105, an unapplied search condition list that includes the search conditions which could not be applied in the search queries generated with respect to the target services for searching. If there are no search conditions which could not be applied in the search queries generated with respect to the target services for searching, then the second generator 103 may not output any unapplied search condition list to the obtaining unit 105 or may output an unapplied search condition list having null values set therein to the obtaining unit 105. Then, in an identical manner to the first embodiment, the execution control unit 104 performs the operations at Steps S111 and S112, determines the execution order of the search queries, and sequentially outputs the search queries to the obtaining unit 105 in accordance with the execution order that has been determined.

The obtaining unit 105 sequentially executes the search queries that have been output. Herein, the obtaining unit 105 sends a search query to the contents delivery server 403 serving as the service S4 as well as to the contents delivery server 404 serving as the service S5 (Steps S130 and S131). For that, the obtaining unit 105 sends, via the communicating unit 106, HTTP requests each including a search query in a URL.

Upon receiving a search query via the network 301; the contents delivery server 403 executes that search query, obtains the corresponding metadata, and sends that metadata to the receiving apparatus 100" (Step S132). In an identical manner, upon receiving a search query via the network 301; the contents delivery server 404 executes that search query, obtains the corresponding metadata, and sends that metadata to the receiving apparatus 100" (Step S133).

Returning to the explanation with reference to FIG. 23, the obtaining unit 105 receives metadata from the contents delivery server 403 serving as the service S4 as well as from the contents delivery server 404 serving as the service S5; performs appropriate analysis processing on the metadata; obtains a set of common metadata from each set of metadata; and sequentially sends the sets of common metadata to the filtering unit 107 as well as outputs the unapplied search condition list received from the second generator 103 to the filtering unit 107 (Step S301).

Figure 24:
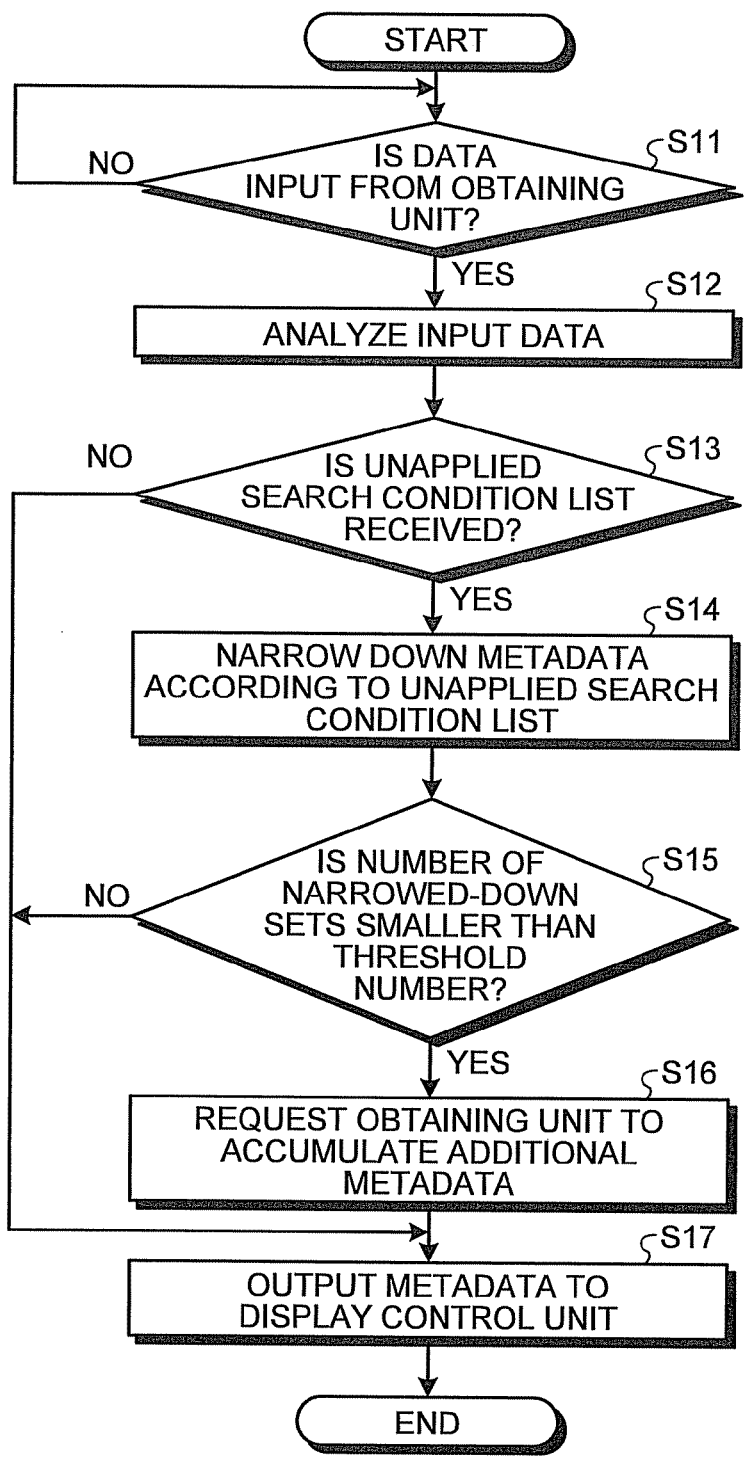
FIG. 24 is a flowchart for explaining a detailed sequence of a filtering operation performed by a filtering unit 107.

Upon obtaining the sets of common metadata output at Step S301 as well as upon obtaining the unapplied search condition list, the filtering unit 107 performs a filtering operation using the received information (Steps S302 to S311). FIG. 24 is a flowchart for explaining a detailed sequence of the filtering operation performed by the filtering unit 107. Subsequent to Step S301 illustrated in FIG. 23, the filtering unit 107 is able to receive input of the metadata output by the obtaining unit 105 and to receive input of the unapplied search condition list (Step S11). Then, the filtering unit 107 analyzes the information received as input at Step S11 (Step S12) and determines whether or not the unapplied search condition list has been received (Step S13). As described above, if there are no search conditions which could not be applied in the search queries generated with respect to the target services for searching; there are times when the unapplied search condition list is not output from the second generator 103 or there are times when the unapplied search condition list output from the second generator 103 has null values set therein. In such cases, the filtering unit 107 determines that the unapplied search condition list has not been received as input. In that case (No at Step S13), the filtering unit 107 does not perform filtering and outputs the metadata received as input at Step S11 to the display control unit 108 (Step S17). On the other hand, when the unapplied search condition list is received as input (Yes at Step S13), the filtering unit 107 applies the search conditions listed in the unapplied search condition list to the metadata received as input at Step S11 and performs filtering of that metadata (Step S14). More particularly, for example, regarding the contents delivery server 403, the unapplied search conditions are sorting conditions according to durations and release dates. Similarly, regarding the contents delivery server 404, the unapplied search conditions are sorting conditions according to titles, durations, and release dates.

The filtering unit 107 performs filtering by searching in the sets of common metadata for the common metadata that matches with the search conditions with the exception of sorting conditions that could not be applied (Step S14). The reason for excluding sorting conditions is that the sorting conditions can be applied only after the sets of common metadata that are independently received as input are merged. Herein, as an example of a search, for example, since the search in the contents delivery server 404 is performed by substituting a title with a keyword; the result of a full-text search is implicitly returned as the execution result of the search queries in the contents delivery server 404. Hence, the sets of metadata received by the receiving apparatus 100" include the specified keyword "ABC" that is included not only in the metadata attribute "title" but also in the metadata attributes "synopsis" or "keyword". From such sets of metadata, the filtering unit 107 extracts those sets of metadata which have "ABC" included only in the title. Moreover, with respect to the extracted sets of metadata, the filtering unit 107 performs filtering by narrowing down the duration to "within 60 minutes". In this way, the filtering unit 107 refers to the value of each common metadata attribute included in the common metadata and searches for such common metadata which matches with the search conditions.

Subsequently, the filtering unit 107 determines whether or not the number of sets of common metadata retrieved as the result of search has reached a predetermined number of sets (Step S15). If the predetermined number of sets is yet to be reached, the filtering unit 107 requests the obtaining unit 105 to obtain further metadata (Step S16). For example, even if it is assumed that the obtaining unit 105 obtains 50 sets of metadata from the contents delivery server 404, there are times when the filtering causes a narrowing down of the sets of metadata to, for example, less than 10 sets of metadata. In the case when the predetermined number of sets of metadata is required for the sorting operation performed by the latter-stage display control unit 108 or for the display operation performed by the contents/metadata displaying unit 101; then, at Step S16, the filtering unit 107 gives the obtaining unit 105 a feedback of the result of filtering and requests the obtaining unit 105 to obtain further metadata. In the above-mentioned specific example of search queries, although the request is issued for obtaining 50 sets of metadata starting from the first set of metadata, the obtaining unit 105 receives the feedback and resends the search queries by specifying 50 sets of metadata starting from the 51-st set of metadata. In a case when a total of 100 sets of metadata are requested and if, for example, obtaining and filtering of 50 sets of metadata yields a result of 10 sets of metadata; then the obtaining unit 105 assumes that the number of sets are narrowed down to 20% and may simultaneously issue a plurality of search queries so as to increase the total number of sets of metadata to 250. Meanwhile, in the contents delivery server 403 too, the search conditions which could not be applied to the search queries are used in the filtering performed by the filtering unit 107. However, since that case is identical to the case of the contents delivery server 404, the explanation is not repeated. Subsequently, to the display control unit 108, the filtering unit 107 outputs the common metadata obtained as a result of searching at Step S14 or outputs the common metadata obtained as a result of searching at Steps S14 and S16 (Step S17).

Returning to the explanation with reference to FIG. 23, Step S303 corresponds to Step S14 described above, Step S304 corresponds to Step S17 described above, and Steps S305 and S306 correspond to Step S16 described above. Steps S308 to S311 are substantially identical to Steps S302 to S305. Meanwhile, as far as a sorting condition according to release dates is concerned, it is still not applied up to this stage.

The display control unit 108 merges the sets of common metadata that are independently output from the filtering unit 107 (Step S312) and performs a sorting operation for sorting the merged metadata according to the above-mentioned sorting condition (Step S313). More particularly, for example, the display control unit 108 breaks the metadata, which is sequentially output from the filtering unit 107, at regular time intervals; and performs a collective sorting operation (batch processing) so that the metadata output from the filtering unit 107 within each time interval is sorted in descending order of release dates, that is, sorted in the order of new releases.

Figure 25:
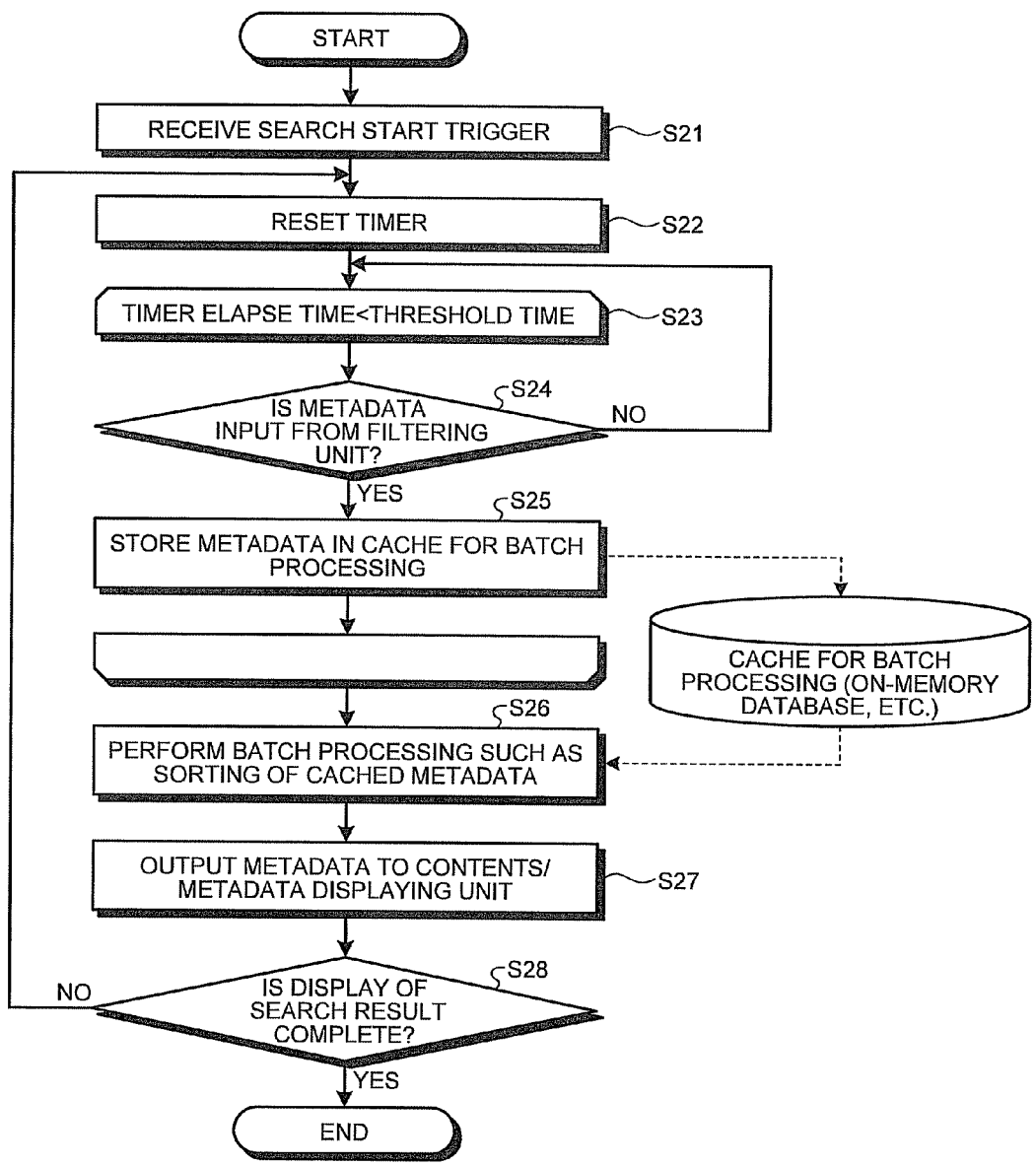
FIG. 25 is a flowchart for explaining a detailed sequence of a sorting operation performed by a display control unit.

Explained below with reference to FIG. 25 is a detailed sequence of the sorting operation performed by the display control unit 108. When it is detected that an operation input of requesting a contents search has been performed via the operation input unit (Step S21), the display control unit 108 resets a timer set regarding a trigger for performing batch processing of metadata (a search start trigger) and then starts the timer (Step S22). Until the timer reaches a threshold time set in advance (Yes at Step S23), the display control unit 108 sequentially stores the metadata output from the filtering unit 107 in a cache region for batch processing (Step S25). Herein, it is assumed that the cache region is in fact an on-memory database. However, that is not the only possible case. Once the timer reaches the threshold time, the display control unit 108 performs a collective sorting operation so that the metadata stored in the cache region for batch processing is sorted in descending order of release dates, that is, sorted in the order of new releases.

Returning to the explanation with reference to FIG. 23, subsequent to Step S313, the display control unit 108 selects a predetermined number of sets of upper level metadata from among the sets of metadata obtained at Step S313 and outputs the selected sets of metadata to the contents/metadata displaying unit 101 (Step S314).

As described above, with respect to metadata that is received independently from a plurality of services and that is a result of executing search queries while excluding some of the search conditions; the filtering unit 107 performs filtering by carrying out a search by excluded search conditions and the display control unit 108 performs the sorting operation. With such a configuration, when there are present a plurality of target services for searching and when the search interface of each service is different; even if the search query for searching intended contents cannot be made compatible to the search interface of each service, it still becomes possible to perform a search while maintaining, to the extent possible, the intent of the search according to the original search formula for searching intended contents.

Modification Example

The present invention is not limited to the above-mentioned embodiments, but may be embodied with various modified components in implementation without departing from the spirit of the invention. Further, the invention can be embodied in various forms by appropriately combining a plurality of components disclosed in the embodiments. For example, some of the components presented in the embodiments may be omitted. Further, some components in different embodiments may be appropriately combined. In addition, various modifications as described below may be made.

In each of the embodiments described above, various programs executed in each of the receiving apparatuses 100, 100', and 100" can be saved on a computer connected to a network and downloaded from that computer via the network. Moreover, the various programs can be stored as installable or executable files in a computer-readable recording medium such as a CD-ROM, a flexible disk (FD), a CD-R, or a DVD (Digital Versatile Disk); and can be provided in the form of a computer program product.

In each of the embodiments described above, the service information can either be stored in advance as preset in the service-information accumulation managing unit 203 or be appropriately stored in the service-information accumulation managing unit 203 when provided from the contents delivery servers 401 and 402. Still alternatively, based on the execution result information stored in the search-query-execution-history accumulation managing unit 205, the service-information accumulation managing unit 203 can automatically generate the service information as described later. That can be achieved by reflecting, in the service information, the information obtained in an empirical manner when, for example, only the contents related to "news" as a subdivision of genres are obtained despite, for example, the fact that the metadata attributes representing the genres and included in the metadata obtained from the contents delivery servers 401 and 402 do not specify the genre code as a search condition.

In each of the embodiments described above, at Step S106 illustrated in FIG. 17 and in FIG. 22, the service information selected as the target for searching is added in the search formula as a common search condition. However, that is not the only possible case. For example, the selected service information can also be separately input to the latter-stage second generator 103.

Moreover, in each of the embodiments described above, the search conditions that either are generated by the contents/metadata displaying unit 101 or are specified by the user can be directly output to the latter-stage second generator 103 without using the selecting unit 102. In that case, for example, the target services for searching can be, in a fixed manner, all of the services for which the service information is stored in the service-information accumulation managing unit 203. Alternatively, the contents/metadata displaying unit 101 can be configured to include an interface that enables the user to select target services for searching, so that the services selected via that interface can be treated as the target services for searching.

Furthermore, in each of the embodiments described above, an upper limit may or may not be set for the services selected as the target services for searching. If an upper limit is set, either the value thereof can be internally defined to a fixed value or the receiving apparatus 100 can be configured to include an interface that enables the user to set the value of the upper limit.

In each of the embodiments described above, the receiving apparatus executes search queries so as to obtain metadata from contents delivery servers that store therein contents or metadata of the contents in a searchable condition. However, that is not the only possible case. Alternatively, the metadata can be obtained via an information processing apparatus that stores therein at least the metadata of the contents in a searchable condition.

Moreover, in each of the embodiments described above, upon obtaining metadata from the services, the receiving apparatus can obtain, separately from those services, the contents having attributes represented by the metadata.

Furthermore, in the first embodiment described above, the execution control unit 104 determines the execution order of the search queries executed by the second generator 103, and the obtaining unit 105 executes the search queries according to that execution order. Alternatively, the configuration can be such that the receiving apparatus 100 does not include the execution control unit 104, and the obtaining unit 105 executes the search queries in the order in which the second generator 103 has generated them.

Moreover, in the first embodiment described above, the service S1 as well as the service S2 is available on the network 301. Instead, it is also possible that the service S1 and the service S2 are available on different networks. For example, one of the contents delivery servers can be installed on the Internet and the other contents delivery server can be installed on either an NGN (Next Generation Network) or a Home Network. In this way, even when the target services for searching are present on different networks; as long as the communicating unit 106 has the accessibility to all networks, each of the services can be treated as a target service for searching. The same is true in the case of the second and third embodiments.

In the second embodiment described above, regarding the services having hierarchical relationship therebetween; based on the search query format specified in the service information, the receiving apparatus 100' generates a single search query (in the above-mentioned example, a single SQL statement) including the hierarchical relationship information as a search condition attribute. Alternatively, the receiving apparatus 100' can be configured to include a determining unit that determines whether or not to generate a search query for each service for which the hierarchical relationship is identified in the hierarchical relationship information. In this case, the second generator 103 can follow the determination made by the determining unit and accordingly generate search queries using the common search query generated by the contents/metadata displaying unit 101.

In the third embodiment described above, the obtaining unit 105 outputs the result of metadata analysis to the filtering unit 107. Instead, the obtaining unit 105 can output the result of metadata analysis to the display control unit 108 without using the filtering unit 107.

Alternatively, regarding a common search condition attribute included in the metadata attributes in a particular service, the second generator 103 can determine that the common search condition attribute is a search condition attribute that is applicable as a filter with respect to the received metadata and then can output that common search condition attribute to the filtering unit 107.

Moreover, in the third embodiment described above, as the method of establishing the sets of common metadata to be batch-processed as the target sets for sorting (batch processing), the display control unit 108 breaks the metadata at regular time intervals. However, as alternative methods, the display control unit 108 can break the metadata after every predetermined number of sets or can break the metadata into a plurality of sets of metadata with respect to each target service for searching. In this way, various methods can be implemented to determine the unit for performing batch processing. Besides, in order to narrow down the metadata to be displayed on the contents/metadata displaying unit 101; instead of selecting a predetermined number of sets of upper level metadata from among batch-processed common metadata, the display control unit 108 can, for example, refer to the reproduction history information and the skipping history information stored in the contents-viewing/skipping-history accumulation managing unit 202 or refer to the keyword information stored in the keyword generation/accumulation managing unit 204 and accordingly assign priority to the contents of services having high reproduction frequencies, and sequentially select the common metadata corresponding to those priority contents. Alternatively, the receiving apparatus 100" can be configured to have a function of analyzing the preferences of a user by referring to the reproduction history information and the skipping history information stored in the contents-viewing/skipping-history accumulation managing unit 202. Then, the display control unit 108 can refer to the preferences of that user, assign priority to the contents of high preference, and sequentially select the common metadata corresponding to those priority contents. Still alternatively, the receiving apparatus 100" can be configured to have a function that, in the case of searching for contents related to the contents being reproduced, calculates the degree of similarity from the degree of matching between metadata attributes of the metadata of the contents being reproduced and metadata attributes of the metadata stored in the metadata accumulation managing unit 201. Consequently, priority can be assigned to the contents of high degrees of similarity and the common metadata corresponding to those priority contents can be sequentially selected.

Furthermore, in the third embodiment described above, for example, along with displaying 20 sets of metadata on the display unit, the display control unit 108 can store a predetermined number of sets of metadata, starting from the 21-st set of metadata that may be referred next, in the cache of an on-memory database in the metadata accumulation managing unit 201 or in the display control unit 108. In that case, along with the selection of metadata to be displayed as described above; the display control unit 108 can also be configured to refer to the reproduction history information and the skipping history information stored in the contents-viewing/skipping-history accumulation managing unit 202, store the number of sets of metadata that the user can trace, and accordingly determine the number of sets of metadata to be cached.

Moreover, in the third embodiment described above, with respect to the common metadata output from the filtering unit 107, the display control unit 108 performs sorting by following a specific sorting condition such as a sorting condition according to release dates. However, that is not the only possible case. For example, sorting of the common metadata output from the filtering unit 107 can also be performed according to the preferences of a user that are analyzed by referring to the degree of similarity among the contents being reproduced or by referring to the reproduction history information and the skipping history information stored in the contents-viewing/skipping-history accumulation managing unit 202.

Furthermore, in the third embodiment described above, the unapplied search condition list is input to the filtering unit 107 via the obtaining unit 105. However, alternatively, it is also possible that the second generator 103 directly inputs the unapplied search condition list to the filtering unit 107.

According to at least one embodiment, at the time of searching for contents in a plurality of different services, a receiving apparatus enables the user to search for the intended contents even if the search criteria of each service are not the same.

What is claimed is:

1. A receiving apparatus comprising:
a memory configured to store service information including search criteria set in a memory device and a connection method for connecting with the memory device, the memory device storing attribute information including attributes of contents in a searchable condition and being connectable via a network, the service information is defined on a service-by-service basis;
a first generator configured to generate a common search query that expresses search conditions used in searching content and at least a pair of a common search condition attribute and a common search condition attribute value, the common search condition attribute having a common mode of expression of a search condition attribute that represents any of the attributes, the common search condition attribute value being a value taken by the common search condition attribute;
a second generator configured to generate a search query according to the search criteria specified in the service information with the use of the generated common search query;
a transmitter configured to transmit the generated search query to the memory device based on the connection method specified in the service information; and
a receiver configured to receive, from the memory device, the attribute information obtained as a result of executing the search query, wherein
the attribute information is metadata,
the service information further includes a metadata attribute that is an attribute represented by the metadata which is provided as a result of executing the search query and a metadata description format that is a description format of the metadata, includes a search condition attribute representing the metadata attribute that is specifiable as a search condition in the search query, the search conditional attribute is defined on the service-by-service basis, includes a search query description format representing a description format of the search query that can be processed by the memory device, and includes a metadata attribute conversion table representing a correspondence relationship between the metadata attributes, the search condition attributes, and the common search condition attributes, and the second generator generates the search query that includes the search condition attributes and that is written in the search query description format, the search condition attributes being obtained by conversion of the common search condition attributes included in the common search query with the use of the metadata attribute conversion table, wherein the common search query has, as a common search condition attribute, a service identifier for identifying the service information, and, when a plurality of the memory devices has a hierarchical relationship therebetween, has, as a common search condition attribute, hierarchical relationship information for identifying the hierarchical information, the apparatus further comprises a determining unit configured to, based on the search query description format specified in the service information, determine whether to generate a single of the search query including the hierarchical information as the search condition attribute or to generate the search query according to the memory device for which hierarchical relationship is identified with the hierarchical relationship information, wherein the second generator generates the search query according to determination of the determining unit by using the generated common search query.

2. The apparatus according to claim 1, wherein
the service information further includes a metadata attribute value conversion table representing a correspondence relationship between search condition attribute values and the common search condition attribute values, the search condition attribute values being values which are taken by the search condition attributes defined according to the memory device, and the second generator generates the search query that includes the search condition attributes and the search condition attribute values, and that is written in the search query description format, the search condition attributes being obtained by conversion of the common search condition attributes included in the common search query with the use of the metadata attribute conversion table, the search condition attribute values being obtained by conversion of the common search condition attribute values included in the common search query with the use of the metadata attribute value conversion table.

3. The apparatus according to claim 1, further comprising an execution control unit configured to control an execution order of a plurality of the search queries that has been generated.

4. A receiving apparatus comprising:
a memory configured to store service information including search criteria set in a memory device and a connection method for connecting with the memory device, the memory device storing attribute information including attributes of contents in a searchable condition and being connectable via a network, the service information is defined on a service-by-service basis;

a first generator configured to generate a common search query that expresses search conditions used in searching content and at least a pair of a common search condition attribute and a common search condition attribute value, the common search condition attribute having a common mode of expression of a search condition attribute that represents any of the attributes, the common search condition attribute value being a value taken by the common search condition attribute;

a second generator configured to generate a search query according to the search criteria specified in the service information with the use of the generated common search query;

a transmitter configured to transmit the generated search query to the memory device based on the connection method specified in the service information; and a receiver configured to receive, from the memory device, the attribute information obtained as a result of executing the search query, wherein the attribute information is metadata,
the service information further includes a metadata attribute that is an attribute represented by the metadata which is provided as a result of executing the search query and a metadata description format that is a description format of the metadata, includes a search condition attribute representing the metadata attribute that is specifiable as a search condition in the search query, the search conditional attribute is defined on the service-by-service basis, includes a search query description format representing a description format of the search query that can be processed by the memory device, and includes a metadata attribute conversion table representing a correspondence relationship between the metadata attributes, the search condition attributes, and the common search condition attributes, the second generator generates the search query that includes the search condition attributes and that is written in the search query description format, the search condition attributes being obtained by conversion of the common search condition attributes included in the common search query with the use of the metadata attribute conversion table; and a selecting unit configured to, based on a degree of matching between the common search condition attribute included in the common search query and the common search condition attribute for which the service information specifies the correspondence relationship, select the service information and select, as a target for searching, the memory device for which the selected service information specifies a connection method, wherein the second generator generates the search query according to search criteria specified in the service information of the selected memory device with the use of the generated common search query.

5. The apparatus according to claim 4, wherein, when a common search condition attribute value which is taken by the common search condition attribute corresponds to all contents having attributes thereof specified in the metadata stored in the memory device that has a connection method thereof specified in the service information, then the service information further includes the pair of the common search condition attribute and the common search condition attribute value.

6. The apparatus according to claim 4, wherein
when a first common search condition attribute is included in the common search query, the second generator generates the search query from the common search query not including the first common search condition attribute and a first common search condition attribute value that is the common search condition attribute value which is taken by the first common search condition attribute, the first common search condition attribute being the common search condition attribute that is not included in the search condition attributes in the service information but that is included in the metadata attributes that are provided, and the receiving apparatus further comprises a filtering unit configured to perform filtering of the received metadata with the use of the first common search condition attribute and the first common search condition attribute value.

7. A receiving apparatus comprising:

a memory configured to store service information including search criteria set in a memory device and a connection method for connecting with the memory device, the memory device storing attribute information including attributes of contents in a searchable condition and being connectable via a network, the service information is defined on a service-by-service basis;

a first generator configured to generate a common search query that expresses search conditions used in searching content and at least a pair of a common search condition attribute and a common search condition attribute value, the common search condition attribute having a common mode of expression of a search condition attribute that represents any of the attributes, the common search condition attribute value being, a value taken by the common search condition attribute;

a second generator configured to generate a search query according to the search criteria specified in the service information with the use of the generated common search query;

a transmitter configured to transmit the generated search query to the memory device based on the connection method specified in the service information; and a receiver configured to receive, from the memory device, the attribute information obtained as a result of executing the search query, wherein the attribute information is metadata, the service information further includes a metadata attribute that is an attribute represented by the metadata which is provided as a result of executing the search query and a metadata description format that is a description format of the metadata, includes a search condition attribute representing the metadata attribute that is specifiable as a search condition in the search query, the search conditional attribute is defined on the service-by-service basis, includes a search query description format representing a description format of the search query that can be processed by the memory device, and includes a metadata attribute conversion table representing a correspondence relationship between the metadata attributes, the search condition attributes, and the common search condition attributes, the second generator generates the search query that includes the search condition attributes and that is written in the search query description format, the search condition attributes being obtained by conversion of the common search condition attributes included in the common search query with the use of the metadata attribute conversion table; and a display control unit configured to display the received metadata on a display unit and configured to, when a first common search condition attribute is included in the common search query and when the search condition attributes represent a processing condition that is applicable before displaying the metadata and after a plurality of the metadata obtained from each of a plurality of the memory device is integrated, integrate entirely or partially the received metadata, apply the processing condition specified in the search condition attributes with respect to the metadata that has been integrated, and display the metadata on the display unit, the first common search condition attribute being the common search condition attribute that is not included in the search condition attributes in the service information but that is included in the metadata attributes that are provided.

8. The apparatus according to claim 7, wherein in the common search query, the relationship between a plurality of search conditions is expressed as a Boolean expression, the service information further includes a search query description format representing a description format of the search query that is processed by the memory device, and when the search query description format specified in the service information indicates that description as the Boolean expression is possible, the second generator generates, from the common search query, the search query expressed as the Boolean expression, and when the search query description format indicates that description as the Boolean expression is not possible, the second generator performs product term expansion of the Boolean expression and generate a plurality of search queries from the common search query with the use of each product term.

\* \* \* \* \*